United States Patent
Papica

(10) Patent No.: US 10,361,634 B2
(45) Date of Patent: Jul. 23, 2019

(54) AUTO-TUNING CURRENT LIMITER

(71) Applicant: SEMICONDUCTOR COMPONENTS INDUSTRIES, LLC, Phoenix, AZ (US)

(72) Inventor: Petr Papica, Frenstat pod Radhostem (CZ)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/010,931

(22) Filed: Jun. 18, 2018

(65) Prior Publication Data

US 2018/0309370 A1 Oct. 25, 2018

Related U.S. Application Data

(62) Division of application No. 15/179,595, filed on Jun. 10, 2016, now Pat. No. 10,027,231.

(51) Int. Cl.
*H02M 3/335* (2006.01)
*H02M 1/32* (2007.01)
*H02M 1/00* (2006.01)

(52) U.S. Cl.
CPC ......... *H02M 3/33523* (2013.01); *H02M 1/32* (2013.01); *H02M 2001/0009* (2013.01)

(58) Field of Classification Search
CPC ............... H02M 3/33523; H02M 1/32; H02M 2001/0009
See application file for complete search history.

(56) References Cited

U.S. PATENT DOCUMENTS

| 4,620,296 | A | * | 10/1986 | Siemon | H02H 7/1216 |
| | | | | | 318/803 |
| 5,204,594 | A | * | 4/1993 | Carobolante | G05F 1/575 |
| | | | | | 318/400.04 |
| 7,230,406 | B2 | | 6/2007 | Huang et al. | |
| 7,301,319 | B2 | | 11/2007 | Balakrishnan et al. | |
| 7,505,287 | B1 | | 3/2009 | Kesterson | |
| 8,120,347 | B1 | | 2/2012 | Cao | |
| 8,471,543 | B2 | | 6/2013 | Nakazono | |
| 8,599,581 | B2 | * | 12/2013 | Huang | H02M 3/33523 |
| | | | | | 363/21.12 |
| 9,306,462 | B2 | | 4/2016 | Yau | |
| 9,872,347 | B2 | * | 1/2018 | Li | H05B 33/0815 |
| 2007/0090818 | A1 | * | 4/2007 | Nishimori | H02M 1/15 |
| | | | | | 323/282 |

(Continued)

OTHER PUBLICATIONS

ON Semiconductor, "Fixed Frequency Current Mode Controller for Flyback Converters," NCP1236 Datasheet, Jan. 2016, Rev. 5, 34 pages.

*Primary Examiner* — Kyle J Moody
(74) *Attorney, Agent, or Firm* — Dickinson Wright PLLC

(57) ABSTRACT

A power conversion circuit is provided. A reference signal is integrated over a first timer period. A second signal is generated that is approximately proportional to an output current of the power conversion circuit. The second signal is integrated over a second time period. A first result of the integration of the reference signal is compared to a second result of the integration of the second signal. A fault signal is asserted if the second result is greater than the first result.

20 Claims, 12 Drawing Sheets

(56) References Cited

U.S. PATENT DOCUMENTS

| | | | |
|---|---|---|---|
| 2007/0247081 A1* | 10/2007 | Pratlong | H02M 3/07 315/244 |
| 2009/0284235 A1* | 11/2009 | Weng | H02M 3/156 323/222 |
| 2014/0217911 A1 | 8/2014 | Mednik | |
| 2016/0126859 A1* | 5/2016 | Wang | G06F 1/263 713/300 |
| 2016/0248412 A1* | 8/2016 | Kadowaki | H03K 17/165 |
| 2016/0254817 A1* | 9/2016 | Vahid Far | H02M 3/07 327/157 |
| 2017/0093296 A1 | 3/2017 | Chen | |
| 2017/0110973 A1 | 4/2017 | Chen | |
| 2017/0279355 A1 | 9/2017 | Kudva et al. | |
| 2017/0346385 A1* | 11/2017 | Liang | H02M 3/156 |

* cited by examiner

AUTO-TUNING CURRENT LIMITER

The present application is a division of U.S. patent application Ser. No. 15/179,595, filed Jun. 10, 2016, which application is incorporated herein by reference.

BACKGROUND

Semiconductor devices are commonly found in modern electronic products. Semiconductor devices vary in the number and density of electrical components. Discrete semiconductor devices generally contain one type of electrical component, e.g., light emitting diode (LED), small signal transistor, resistor, capacitor, inductor, and power metal-oxide-semiconductor field-effect transistor (MOSFET). Integrated semiconductor devices typically contain hundreds to millions of electrical components. Examples of integrated semiconductor devices include microcontrollers, microprocessors, and various signal processing circuits.

Semiconductor devices perform a wide range of functions such as signal processing, high-speed calculations, transmitting and receiving electromagnetic signals, controlling electronic devices, transforming sunlight to electricity, and creating visual images for television displays. Semiconductor devices are found in the fields of entertainment, communications, power conversion, networks, computers, and consumer products. Semiconductor devices are also found in military applications, aviation, automotive, industrial controllers, and office equipment.

FIG. 1 illustrates electronic device 50 having a chip carrier substrate or printed circuit board (PCB) 52 with a plurality of semiconductor packages mounted on a surface of the PCB. Electronic device 50 can have one type of semiconductor package, or multiple types of semiconductor packages, depending on the application. Different types of semiconductor packages are shown in FIG. 1 for purposes of illustration.

Electronic device 50 can be a stand-alone system that uses the semiconductor packages to perform one or more electrical functions. Alternatively, electronic device 50 can be a subcomponent of a larger system. For example, electronic device 50 can be part of a tablet, cellular phone, digital camera, television, power supply, or other electronic device. Electronic device 50 can also be a graphics card, network interface card, or other expansion card that is inserted into a personal computer. The semiconductor packages can include microprocessors, memories, application specific integrated circuits (ASIC), programmable logic circuits, analog circuits, radio frequency (RF) circuits, discrete devices, or other semiconductor die or electrical components.

In FIG. 1, PCB 52 provides a general substrate for structural support and electrical interconnect of the semiconductor packages mounted on the PCB. Conductive signal traces 54 are formed over a surface or within layers of PCB 52 using evaporation, electrolytic plating, electroless plating, screen printing, or another suitable metal deposition process. Signal traces 54 provide for electrical communication between each of the semiconductor packages, mounted components, and other external system components. Traces 54 also provide power and ground connections to each of the semiconductor packages. A clock signal is transmitted between semiconductor packages via traces 54 in some embodiments.

For the purpose of illustration, several types of first level packaging, including bond wire package 56 and flipchip 58, are shown on PCB 52. Additionally, several types of second level packaging, including ball grid array (BGA) 60, bump chip carrier (BCC) 62, land grid array (LGA) 66, multi-chip module (MCM) 68, quad flat non-leaded package (QFN) 70, quad flat package 72, embedded wafer level ball grid array (eWLB) 74, and wafer level chip scale package (WLCSP) 76 are shown mounted on PCB 52. Depending upon the system requirements, any combination of semiconductor packages, configured with any combination of first and second level packaging styles, as well as other electronic components, can be connected to PCB 52.

A manufacturer of electronic device 50 provides a power signal to the electronic device which is used to power the semiconductor packages and other devices disposed on PCB 52. In many cases, the provided power signal is at a different voltage potential than the voltage required to operate the individual semiconductor devices. The manufacturer will generally provide a power conversion circuit on PCB 52 to generate a steady direct current (DC) voltage signal at a voltage potential usable by the individual semiconductor packages and other components connected to the PCB. Switch-mode power supplies (SMPS) are commonly used due to efficiency advantages.

An SMPS for electronic device 50 may be located on PCB 52, or located externally and connected to PCB 52 by a cable and plug. The plug may include both power and data lines, e.g., when electronic device 50 is a cell phone or tablet computer and power is provided by a Universal Serial Bus (USB) interface. In some embodiments, electronic device 50 follows the USB Power Delivery (USB-PD) protocol to negotiate a voltage potential for power delivery by an external SMPS.

An SMPS operates by switching an input power signal on and off repeatedly to create a relatively high-frequency power signal. The switched power signal is routed through a transformer or inductor, and then rectified and filtered to create a steady DC power signal. The output power signal is commonly rectified by one or more diodes, or a transistor is used for synchronous rectification.

A circuit diagram for one exemplary embodiment of a flyback SMPS 100 is illustrated in FIG. 2. SMPS 100 is split into a primary side 102 and a secondary side 104, which are delineated by transformer 105. Transformer 105 includes a primary winding 106 as part of primary side 102 and a secondary winding 108 as part of secondary side 104. Primary side 102 of SMPS 100 is made up of the components electrically connected to primary winding 106. Secondary side 104 of SMPS 100 is made up of the components electrically connected to secondary winding 108. Transformer 105 provides DC isolation between primary side 102 and secondary side 104. Alternating current (AC) signals through primary winding 106 are transferred to secondary winding 108 by magnetic coupling, while any DC offset is substantially ignored.

Primary side 102 includes a power input at bulk voltage ($V_{BULK}$) node 110. In some embodiments, $V_{BULK}$ node 110 receives a rectified AC power signal provided by an electric utility at, e.g., 110 or 230 volts AC. The AC electric signal is routed to a residence, commercial office building, or other premises by power mains and input to the electronic device including SMPS 100 by plugging the device into a wall outlet. A diode bridge or other rectifier circuit rectifies the input AC mains signal to include positive voltage values at $V_{BULK}$ node 110. In other embodiments, a power signal is provided to $V_{BULK}$ node 110 by other means. A capacitor 111 is coupled between $V_{BULK}$ node 110 and ground node 113 to further filter the input power signal. Ground node 113 operates as the ground reference voltage for the electrical components of primary side 102.

Electric current from $V_{BULK}$ node 110 through primary winding 106 to ground node 113 is turned on and off by primary MOSFET 112. Primary MOSFET 112 includes a drain terminal coupled to primary winding 106 opposite $V_{BULK}$ node 110, a gate terminal 114 coupled to primary flyback controller 120, and a source terminal coupled to current sense resistor 118 at current sense (CS) node 119. The source and drain terminals of primary MOSFET 112 are conduction terminals, and the gate is a control terminal. Controller 120 turns on, or enables electric conduction through, primary MOSFET 112 by providing a positive voltage potential at the gate terminal of the MOSFET via circuit node (DRV) 114. In some embodiments, additional driver circuitry is coupled between controller 120 and the gate of MOSFET 112. When primary MOSFET 112 is turned on, electric current flows from $V_{BULK}$ node 110 to ground node 113 through primary winding 106, primary MOSFET 112, and resistor 118 in series. Controller 120 turns off primary MOSFET 112 by outputting a ground voltage potential to the gate of primary MOSFET 112. While primary MOSFET 112 is off, no significant current flows from $V_{BULK}$ node 110 through primary winding 106.

In the ideal case, an n-channel MOSFET exhibits zero resistance when its gate has a positive voltage potential, and exhibits infinite resistance when its gate is at ground potential. MOSFET 112 is an n-channel MOSFET that operates as a switch opened and closed by a control signal from controller 120 coupled to the MOSFET's gate terminal 114. A switch, e.g., MOSFET 112, being closed is also referred to as the switch being "on," because electric current is able to flow between conduction terminals of the switch. An open switch is referred to as being "off" because current does not flow significantly between the conduction terminals of the switch. While the switch of SMPS 100 is illustrated as a MOSFET, other types of electronically controlled switches, e.g., bipolar-junction transistors (BJTs), p-channel MOSFETs, gallium arsenide transistors, junction gate field-effect transistor, other types of field-effect transistors (FETs), and other types of electronic switches, are used in other embodiments. FETs include source and drain terminals, which are conduction terminals, and a gate terminal as a control terminal. BJTs include emitter and collector terminals, which are conduction terminals, and a base terminal as a control terminal.

Controller 120 determines when to switch primary MOSFET 112 by observing the magnitude of current through primary winding 106. Resistor 118 creates a voltage potential difference between ground node 113 and CS node 119 when current flows through the resistor. The voltage potential across resistor 118, as observed at CS node 119, is approximately proportional to the current through primary winding 106. CS node 119 is coupled to a current sense input pin of controller 120. Controller 120 observes the voltage potential at CS node 119 to determine the electric current magnitude through primary winding 106.

While controller 120 has primary MOSFET 112 turned on, electric current through primary winding 106 increases approximately linearly and magnetizes transformer 105. When controller 120 turns off primary MOSFET 112, electric current through primary winding 106 is substantially stopped. The magnetic energy stored in transformer 105 while MOSFET 112 is closed is output as electric current through secondary winding 108 while MOSFET 112 is open, creating a positive voltage potential at voltage output ($V_{OUT}$) node 124 relative to ground node 126. Ground node 126 operates as the ground reference voltage for electrical components of secondary side 104. SMPS 100 is an isolated topology, meaning a separate primary side ground node 113 and secondary side ground node 126 are used. The voltage potential of ground node 126 is allowed to float relative to ground node 113.

The voltage potential at $V_{OUT}$ node 124 charges capacitor 128 and powers additional circuit components of electronic device 50 connected to SMPS 100 as a load. The cycle repeats when controller 120 turns on primary MOSFET 112 to again magnetize transformer 105. Capacitor 128 provides power to $V_{OUT}$ node 124 while primary MOSFET 112 is on. Diode 130 rectifies current through secondary winding 108 by reducing electric current flowing from $V_{OUT}$ node 124 to ground node 126 through secondary winding 108 while transformer 105 is being magnetized from primary side 102.

Feedback is provided from secondary side 104 to primary side 102 by Zener diode 154 and optocoupler 155. Optocoupler 155 includes an LED 156 and a phototransistor 158. If the voltage potential at $V_{OUT}$ node 124 exceeds the Zener voltage of Zener diode 154 summed with the voltage drop of LED 156, current flows from $V_{OUT}$ node 124 to ground node 126 through Zener diode 154 and LED 156 in series. Photons emitted by LED 156 hit phototransistor 158, which turns on the phototransistor and increases the coupling of feedback (FB) node 160 of primary flyback controller 120 to ground node 113. As current through LED 156 is increased, the coupling of FB node 160 to ground node 113 through phototransistor 158 is increased, and the voltage potential of FB node 160 is further reduced.

As controller 120 observes voltage potential at FB node 160 being reduced, the controller understands that voltage potential at $V_{OUT}$ node 124 is at or above a desired output voltage potential. Controller 120 takes measures as configured to reduce power transfer from primary side 102 to secondary side 104, e.g., reducing on-time of MOSFET 112 or reducing the switching frequency of DRV signal 114.

FIGS. 3a-3b illustrate SMPS 100 operating in continuous conduction mode (CCM). FIG. 3a illustrates current through primary winding 106, and FIG. 3b illustrates current through secondary winding 108. SMPS 100 operates in two distinct states. Between time 1 and time 2, MOSFET 112 is turned on, and transformer 105 is being magnetized by current from $V_{BULK}$ node 110 to ground node 113 increasing through primary winding 106 as shown in FIG. 3a. At time 2, controller 120 turns off MOSFET 112. Current through primary winding substantially ceases, and the magnetic energy stored in transformer 105 induces an electrical current in secondary winding 108 as seen in FIG. 3b. The electric current through secondary winding 108 charges capacitor 128 and powers the load connected between $V_{OUT}$ node 124 and ground node 126. At time 3, before transformer 105 is fully demagnetized, MOSFET 112 is switched back on. Current through primary winding 106 again increases. Between time 3 and time 4, current through secondary winding is approximately zero due to rectification by diode 130. The load connected to $V_{OUT}$ node 124 is powered by electric charge stored in capacitor 128 during periods when no current is being induced through secondary winding 108.

In FIGS. 3a-3b, $T_{SW}$ is the switching period of DRV signal 114, i.e., the power cycle period of SMPS 100. $T_{ON}$ is the amount of time each switching period $T_{SW}$ that MOSFET 112 is on, and $T_{OFF}$ is the amount of time each switching period $T_{SW}$ that MOSFET 112 is off. $I_{PEAK,P}$ is the magnitude of current through primary winding 106 at the current peak, i.e., at time 2 as MOSFET 112 is being switched off.

$I_{VALLEY,P}$ is the magnitude of current through primary winding 106 at the current valley, i.e., at time 1 as MOSFET 112 is being switched on. Similarly, $I_{PEAK,S}$ is the magnitude of the current peak through secondary winding 108, e.g., at time 2, and $I_{VALLEY,S}$ is the magnitude of the current valley through secondary winding 108, e.g., at time 3.

FIGS. 4a-4b illustrate SMPS 100 operating in discontinuous conduction mode (DCM). FIG. 4a illustrates electric current through primary winding 106 over time, and FIG. 4b illustrates electric current through secondary winding 108 over time. In DCM, SMPS 100 includes two states similar to the states in CCM. From time 1 to time 2, MOSFET 112 is turned on to magnetize transformer 105. Between time 2 and time 3, MOSFET 112 is turned off, and the magnetic energy stored in transformer 105 is discharged to secondary side 104. Unlike in CCM, DCM allows transformer 105 to become nearly fully discharged. At time 3, the magnetic energy stored in transformer 105 has been nearly completely discharged. However, MOSFET 112 is not turned on again until time 4. Between time 3 and time 4 in FIGS. 4a-4b, there is approximately zero current through both primary winding 106 and secondary winding 108. MOSFET 112 does not turn back on to magnetize transformer 105 again until time 4 in FIGS. 4a-4b.

In FIGS. 4a-4b, $T_{DEM}$ represents the amount of time that transformer 105 takes to nearly fully demagnetize (demag-time). In DCM, the demag-time $T_{DEM}$ of transformer 105 is less than the amount of time that MOSFET 112 is off, i.e., $T_{DEM}$ is less than $T_{OFF}$.

Electronic devices that utilize switch-mode power supplies, such as electronic device 50 using SMPS 100, must often include circuitry to limit output current in order to meet safety requirements. In some cases, switch-mode power supplies operate at variable output voltages. However, flyback converters that use current mode feedback are capable of delivering increased electrical current when the output voltage is reduced. The increased current output at lower output voltage results in current output that exceeds safe limits.

Others have tried sampling the signal at CS node 119 halfway through $T_{ON}$ to estimate average secondary current, and integrating the sample value over $T_{OFF}$ or $T_{DEM}$ using an operational amplifier (op-amp) to estimate output current of an SMPS. The op-amp output was been compared against a fixed voltage threshold to detect over-current. However, accurately sampling CS node 119 at the proper time is challenging. In addition, comparing the integral against a fixed voltage threshold does not accurately account for changes in output voltage of the SMPS.

SUMMARY

A need exists for accurately limiting electric current output across a range of output voltage potentials. Accordingly, in one embodiment, the present disclosure is a method of generating a voltage signal comprising the steps of providing a power conversion circuit, integrating a reference signal over a first timer period, generating a second signal approximately proportional to an output current of the power conversion circuit, integrating the second signal over a second timer period, and comparing a first result of the integration of the reference signal to a second result of the integration of the second signal.

In another embodiment, the present disclosure is a method of generating a voltage signal comprising the steps of integrating a reference value over a first time period, integrating a second value over a second time period, and asserting a fault signal if a result of the integration of the second value exceeds a result of the integration of the reference value.

In another embodiment, the present disclosure is a controller for a power conversion circuit comprising an integrator and a drive output. A reference value is configured to control the integrator while the drive output is asserted. A current sense input is configured to control the integrator while the drive output is de-asserted.

DETAILED DESCRIPTION OF THE DRAWINGS

Figure 1:
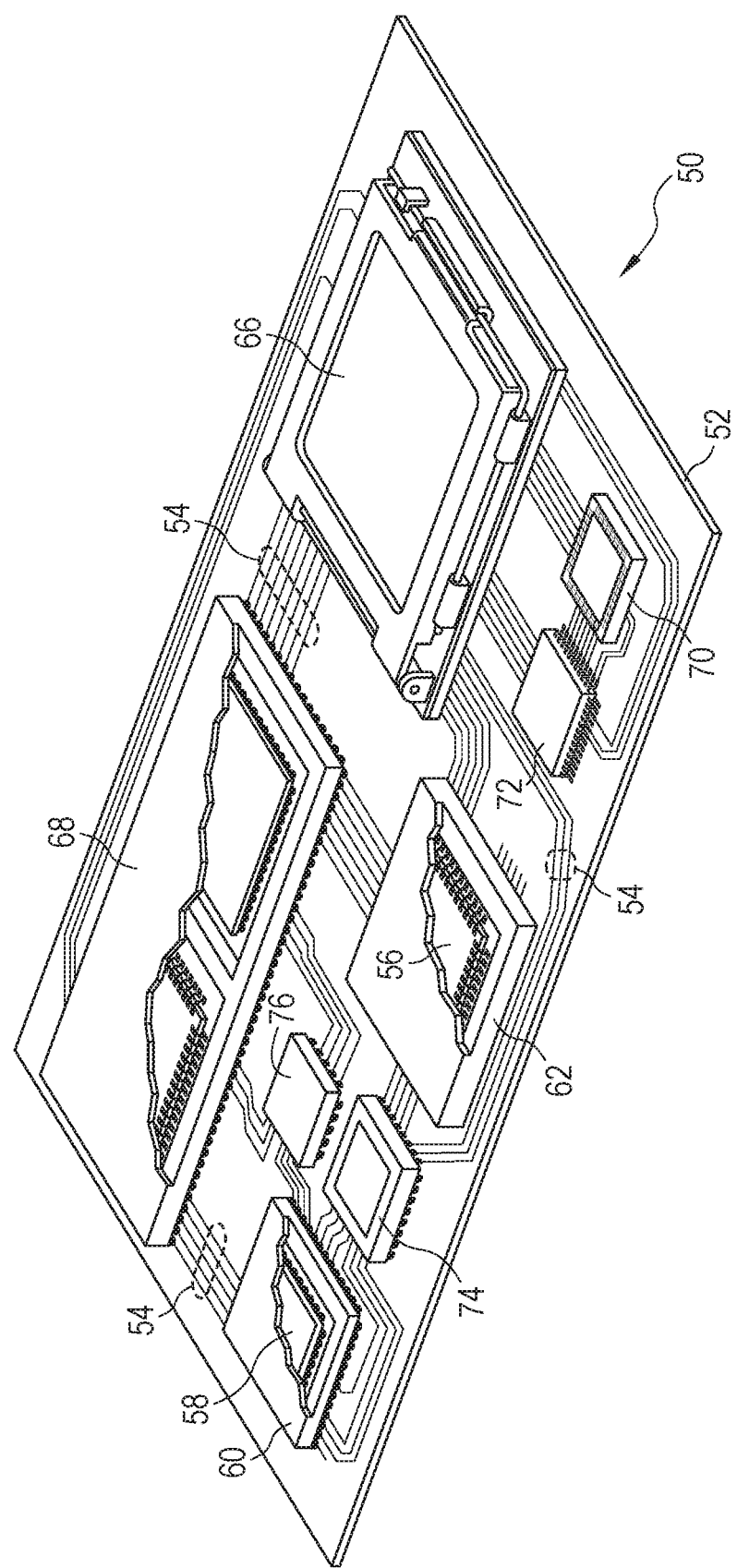
FIG. 1 illustrates an exemplary electronic device that uses a switch-mode power supply (SMPS)
Figure 2:
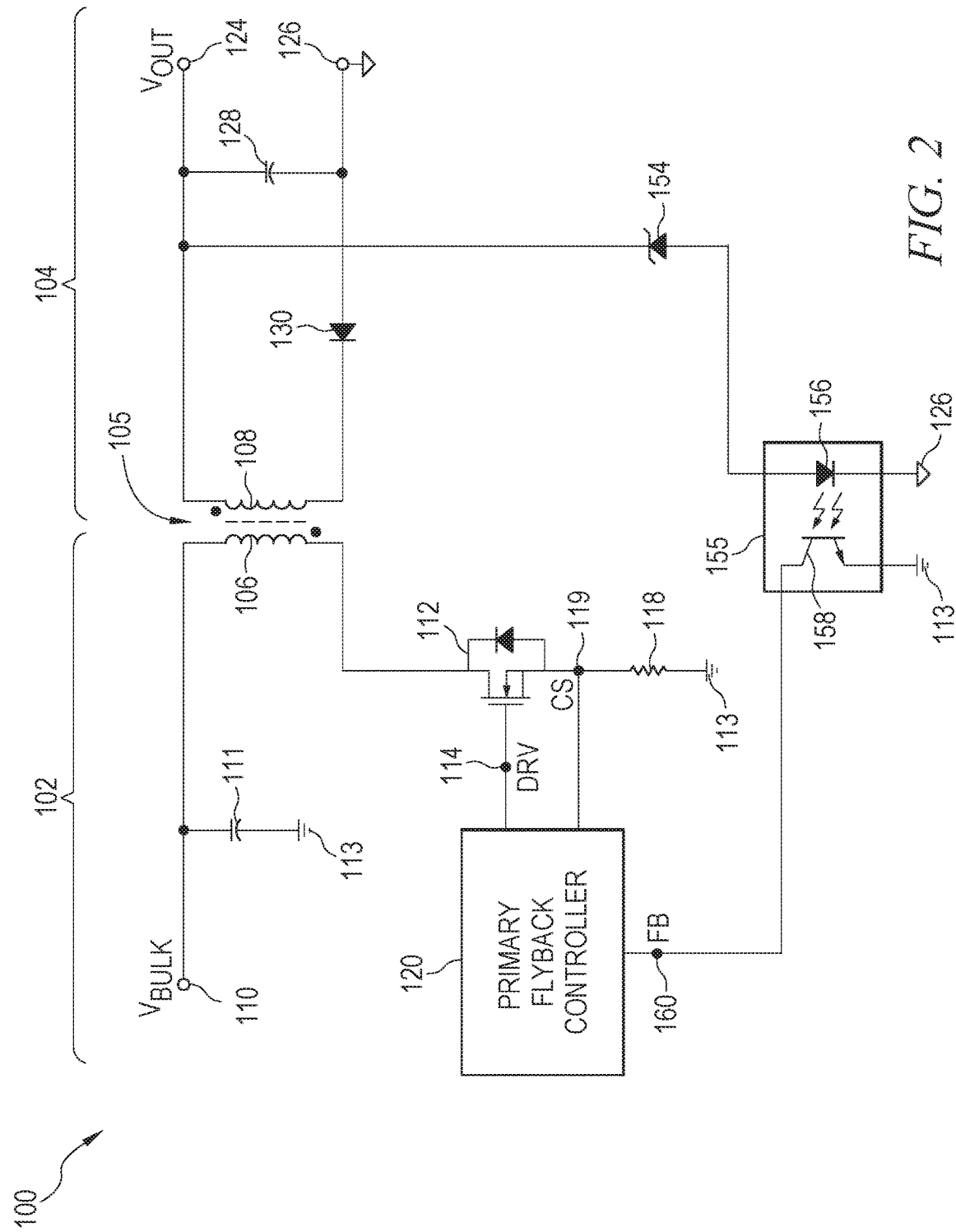
FIG. 2 illustrates an exemplary circuit diagram of a flyback topology SMPS.

The following describes one or more embodiments with reference to the figures, in which like numerals represent the same or similar elements. While the figures are described in terms of the best mode for achieving certain objectives, the description is intended to cover alternatives, modifications, and equivalents as may be included within the spirit and scope of the disclosure.

Current and voltage output of SMPS 100 are controlled by controller 120. Controller 120 modifies the switching of MOSFET 112 to raise or lower the voltage potential at $V_{OUT}$ node 124 and to limit output current. To accurately limit current output of SMPS 100, controller 120 calculates a magnitude of current output to a load connected to $V_{OUT}$ node 124, but makes the calculation from primary side 102. Controller 120 can infer information about secondary side 104 by observing CS node 119 and factoring for the turn ratio of transformer 105. The peak current through secondary winding 108, $I_{PEAK,S}$, is approximately equal to the peak current through primary winding 106, $I_{PEAK,P}$, multiplied by the turns ratio of transformer 105, n. Similarly, $I_{VALLEY,S}$ is approximately equal to $I_{VALLEY,P}$ multiplied by the turns ratio. Controller 120 can therefore calculate output current of SMPS 100 using equation 1 below.

$$I_{OUT} = n \cdot \frac{T_{OFF}}{T_{SW}} \cdot \frac{I_{PEAK,P} + I_{VALLEY,P}}{2} \qquad \text{Equation (1)}$$

By equation 1, controller 120 determines output current. However, controller 120 senses primary current based on the voltage potential at CS node 119 ($V_{CS}$). $V_{CS}$ is related to primary current by Ohm's law (V=I*R). Therefore, electric current through primary winding 106 is approximately equal to $V_{CS}$ divided by the resistance value of resistor 118. Substituting Ohm's law into equation 1, equation 2 is usable by controller 120 to calculate output current based on $V_{CS}$.

$$I_{OUT} = \frac{T_{OFF}}{T_{SW}} \cdot \frac{V_{CS,PEAK} + V_{CS,VALLEY}}{2} \cdot \frac{n}{R_{118}} \quad \text{Equation (2)}$$

Figure 3A:
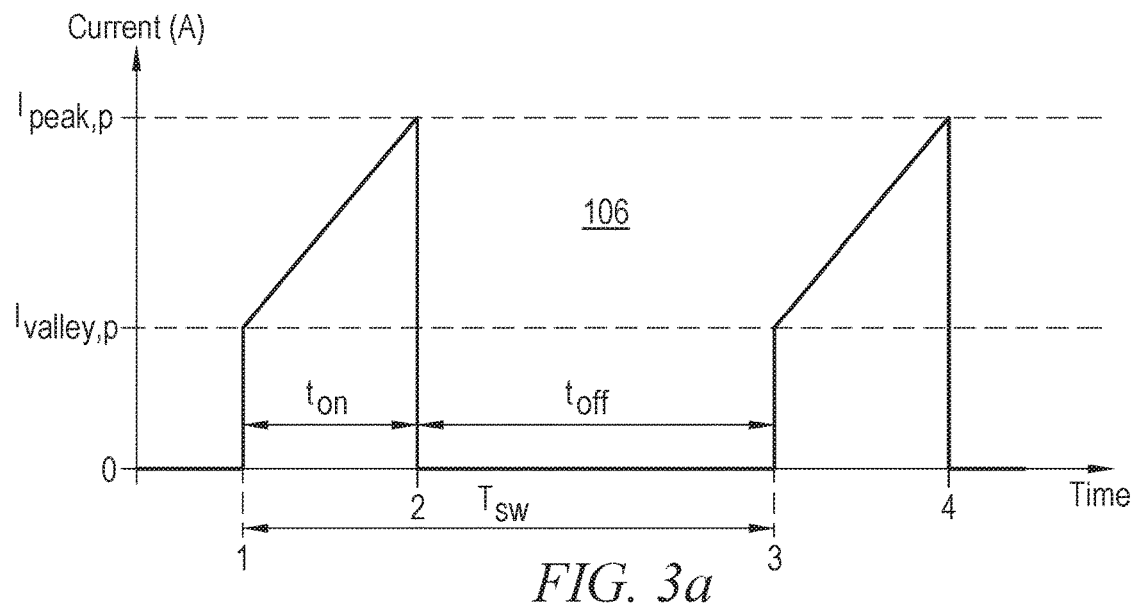
FIGS. 3a-3b illustrate the flyback SMPS operating in continuous conduction mode.
Figure 3B:
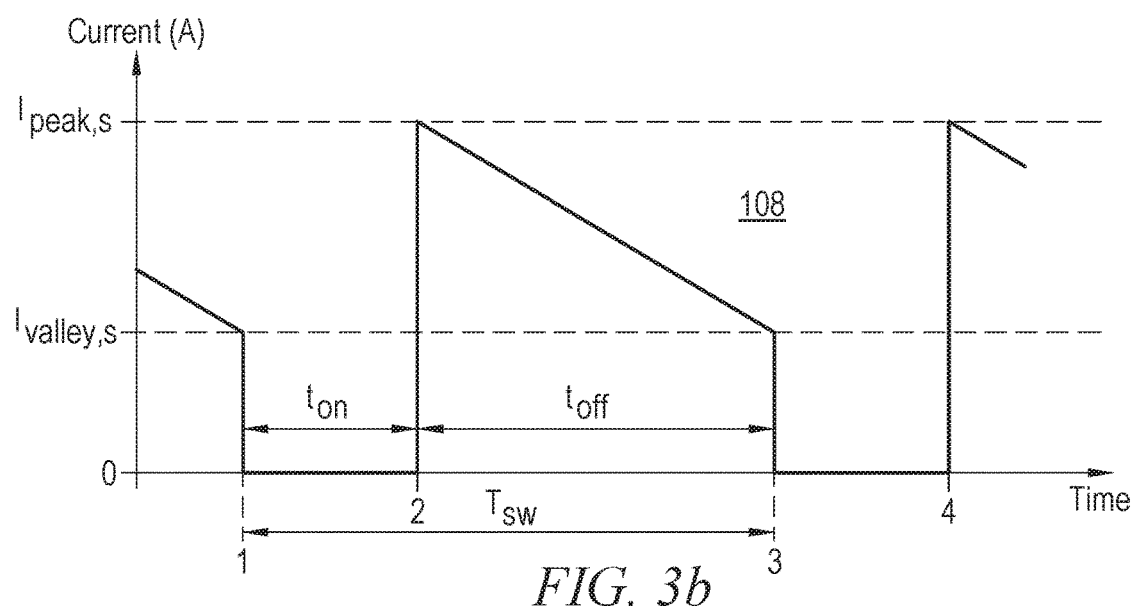
Figure 4A:
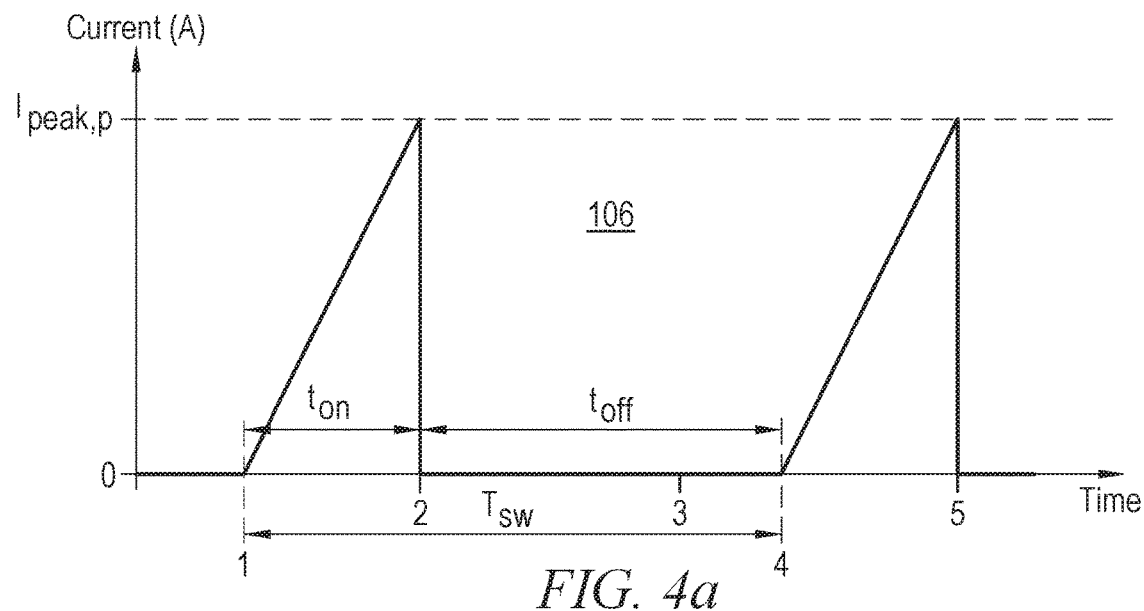
FIGS. 4a-4b illustrate the flyback SMPS operating in discontinuous conduction mode.
Figure 4B:
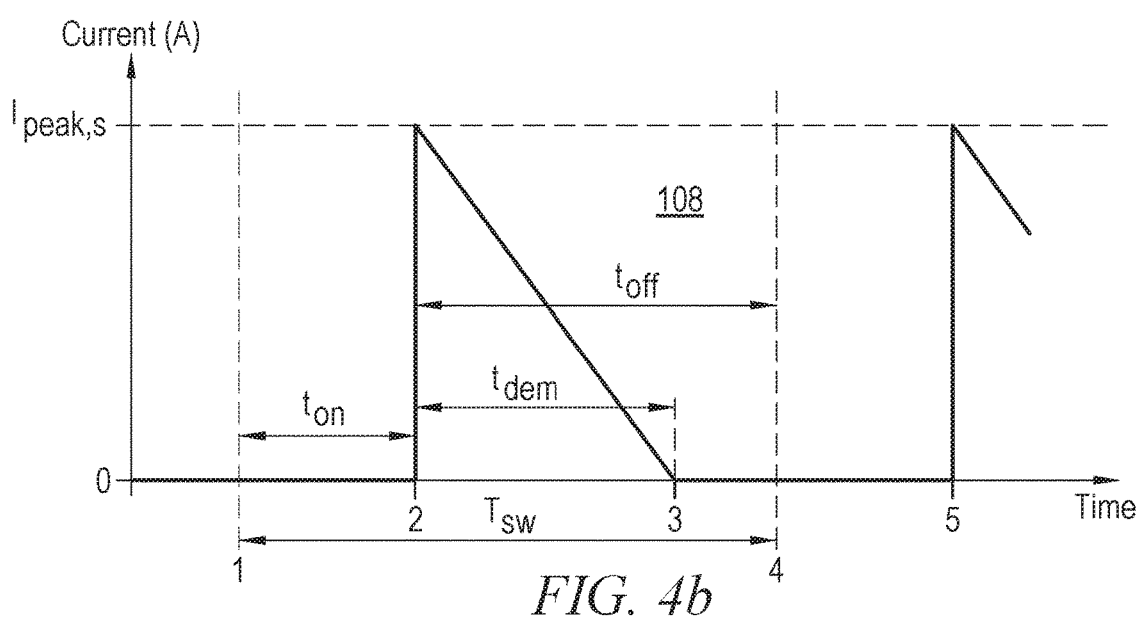

The $T_{OFF}/T_{SW}$ term limits the output current calculation to the time that secondary current is actually flowing through secondary winding 108, i.e., the time when MOSFET 112 is off in CCM. In DCM, current is not output for the entire off-time of MOSFET 112, and $T_{DEM}$ is substituted for $T_{OFF}$ in equation 2. The $(V_{CS,PEAK}+V_{CS,VALLEY})/2$ term of equation 2 calculates the average value of $V_{CS}$ during the on-time of MOSFET 112 since, as seen in FIGS. 3b and 4b, the secondary current is substantially linear. In DCM, current through secondary winding 108 reaches approximately zero, and current through primary winding 106 begins increasing at approximately zero, so $V_{CS,VALLEY}$ in equation 2 is set to zero for DCM operation. Multiplying by the turns ratio, n, converts the average $V_{CS}$ value during the on-time of MOSFET 112 to an equivalent value for secondary winding 108. Dividing by the resistance value of resistor 118 ($R_{118}$) facilitates conversion of the $V_{CS}$ voltage potential to a current value in amperes.

Figure 5:
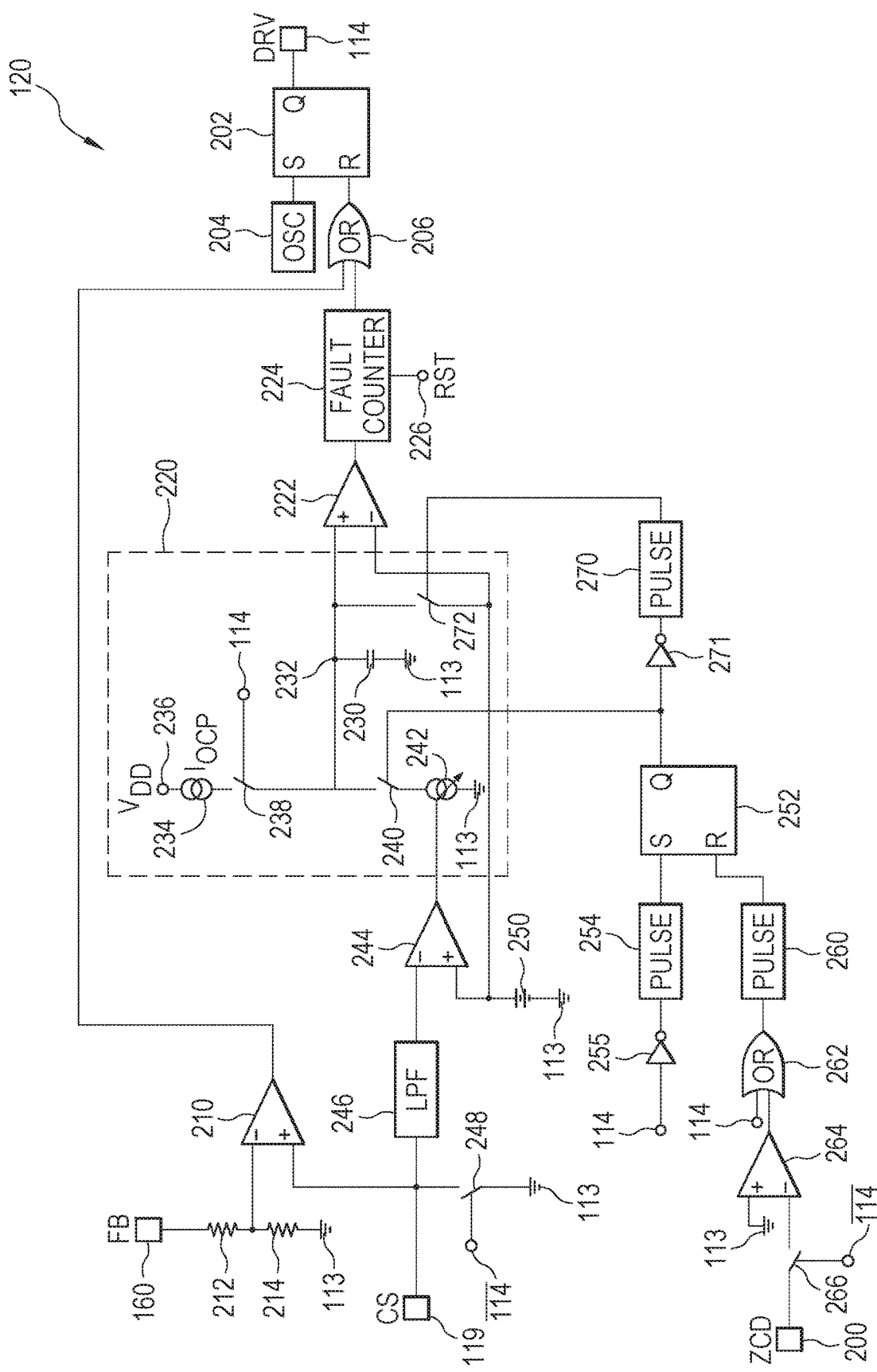
FIG. 5 illustrates a circuit diagram of a controller for the flyback SMPS that includes an auto-tuning current limiter.

FIG. 5 illustrates a current limiting circuit of controller 120 able to limit output current of SMPS 100 from primary side 102. Controller 120 receives FB node 160, CS node 119, and zero current detect (ZCD) node 200 as inputs, and outputs DRV signal 114 to MOSFET 112. DRV signal 114 is generated by set-reset (SR) latch 202. The Q output of an SR latch is asserted as a logic one value when a logic one value is received at a set input (S). The Q output of an SR latch is de-asserted to a logic zero value when a logic one value is received at a reset input (R) of the SR latch. The Q output of an SR latch holds a previous output value until a logic one is received on one of the set or reset inputs. Oscillator 204 is connected to the set input of latch 202. Oscillator 204 outputs a square wave, or similar signal, to assert a logic one value and set SR latch 202 at a regular interval. The period of oscillator 204 sets the power cycle period $T_{SW}$.

Positive, or rising, transitions occur at times when the voltage potential of a circuit node moves from a lower voltage potential state to a higher voltage potential state. Negative, or falling transitions occur at times when the voltage potential of the circuit node moves from a higher voltage potential state to a lower voltage potential state. A rising transition, or rising edge, commonly refers to the transition of a digital signal from a logic zero value to a logic one value. A falling transition, or falling edge, commonly refers to the transition of a digital signal from a logic one value to a logic zero value.

Each clock cycle of oscillator 204, also known as the power cycle of SMPS 100, the oscillator transitions to a logic one and sets SR latch 202, which asserts DRV signal 114 in response. The remaining circuitry illustrated in FIG. 5 is used to determine when to reset SR latch 202, i.e., when to turn off DRV signal 114 to MOSFET 112. Maintaining MOSFET 112 turned on for longer each period of oscillator 204 results in the current through primary winding 106 reaching a higher peak, which results in more power transferred to secondary side 104 each power cycle. Controller 120 limits current output by asserting the reset input of SR latch 202 earlier each power cycle. The reset input of SR latch 202 is coupled to an output of OR gate 206. OR gate 206 has two inputs, either of which when asserted turn off MOSFET 112 by resetting SR latch 202.

A first input to OR gate 206 is coupled to an output of comparator 210. Comparator 210 compares FB node 160 against CS node 119, which is the normal method of terminating the on-time of MOSFET 112 each power cycle. In some embodiments, resistors 212 and 214 are used to reduce the voltage potential of FB node 160, e.g., by a 1-to-4 ratio, prior to comparison with CS node 119. With MOSFET 112 turned on, current through primary winding 106 steadily increases, and so does the voltage potential of CS node 119. MOSFET 112 is turned off by comparator 210 asserting the reset input of SR latch 202 once the voltage potential of CS node 119 exceeds the voltage potential of FB node 160. FB node 160 has an inverse relationship with voltage potential at $V_{OUT}$ node 124. The lower the output voltage at $V_{OUT}$ node 124 falls, the higher voltage potential will be observed on FB node 160, and the longer each power cycle MOSFET 112 will be on before CS node 119 exceeds FB node 160.

Controller 120 includes an additional method to turn off MOSFET 112, or to prevent MOSFET 112 from turning on, during high-current output conditions that exceed rated levels for SMPS 100. Integrator 220 integrates CS node 119 over time to determine output current, and, when output current exceeds a desired threshold, asserts an output through comparator 222, fault counter 224, and OR gate 206 to the reset input of SR latch 202. Integrator 220 causes the output of comparator 222 to pulse high each power cycle if an over-current condition is detected. Fault counter 224 counts the faults over time and asserts an output to OR gate 206 if a certain number of over-current condition pulses are received in a row, or in a certain period of time. The output from fault counter 224 to OR gate 206 remains high, which keeps the reset input of SR latch 202 asserted. SR latch 202 is configured to remain in the reset condition, and outputting a logic zero, while the reset input is asserted, even when a set signal from oscillator 204 is received. A reset input 226 of fault counter 224, when asserted, resets fault counter 224 to de-assert the output holding SR latch 202 off and allow switching of MOSFET 112 to resume. Reset input 226 is asserted when controller 120 receives a hardware reset input event. In some embodiments, reset input 226 is asserted after a predetermined period of time or after the over-current condition no longer exists.

Integrator 220 operates by switching current sources to add and remove electric charge from integrating capacitor ($C_{INT}$) 230. The voltage potential of $C_{INT}$ 230 at integral node 232 represents the integral over time of current sources currently coupled to the integral node. Over-current protection current source ($I_{OCP}$) 234 couples $V_{DD}$ node 236 to integral node 232 through switch 238. $V_{DD}$ node 236 represents a voltage input to the integrated circuit of controller 120 to power the controller. The electric current value in amps of $I_{OCP}$ 234 sets the output current threshold when an over-current condition is detected. Switch 238, as well as the other switches discussed below, is a MOSFET or other electrical switch formed on the same semiconductor die with the rest of controller 120 in one embodiment. Switch 238 is controlled by DRV signal 114, so that $I_{OCP}$ 234 charges $C_{INT}$ 230 from $V_{DD}$ node 236 while MOSFET 112 is turned on.

Charging of $C_{INT}$ 230 while MOSFET 112 is turned on sets a threshold voltage level at integral node 232 each power cycle. Once controller 120 turns off MOSFET 112, integrator 220 opens switch 238 to stop charging $C_{INT}$ 230 and closes switch 240 to begin discharging $C_{INT}$ 230 through current source 242 to ground node 113. Switch 240 is on during the off-time of MOSFET 112 during CCM operation, or during the demag-time under DCM operation.

Current source 242 represents the output of transconductance amplifier 244. Transconductance amplifier 244 receives CS node 119 as an input through low-pass filter (LPF) 246. LPF 246 receives a current sense signal at CS node 119 and outputs a signal approximately proportional to the average voltage potential of CS node 119 over time. Transconductance amplifier 244 receives the average CS node 119 value from LPF 246 and operates transconductance current 242 to output an electrical current proportional to the average voltage potential of CS node 119. Switch 248 is closed when MOSFET 112 is turned off to couple the input of LPF 246 to ground node 113, increasing the accuracy of the average CS node 119 value output by LPF 246.

$C_{INT}$ 230 is charged through $I_{OCP}$ 234 during the on-time of MOSFET 112 to set a threshold each power cycle. The magnitude of $I_{OCP}$ 234 is set by a manufacturer, or configurable by a user of controller 120, to set the desired maximum output current of SMPS 100. $C_{INT}$ 230 is discharged through transconductance current 242 during the off-time of MOSFET 112. Transconductance current 242 is used to infer current through secondary winding 108 during the off-time or demag-time of MOSFET 112.

If the output current through secondary winding 108 exceeds a threshold, the integral of transconductance current 242 over the off-time of MOSFET 112 will exceed the integral of $I_{OCP}$ over the on-time of MOSFET 112. The discharging of $C_{INT}$ 230 over the off-time will cause the voltage potential of integral node 232 to fall below a starting or reference value set by reference voltage ($V_{REF}$) 250. $V_{REF}$ 250 may be ground voltage potential, or may be a positive or negative voltage potential in various embodiments. When the voltage potential at integral node 232 falls below the voltage potential of $V_{REF}$ 250, indicating an over-current condition, the output of comparator 222 is asserted.

$V_{REF}$ 250 and integral node 232 are each coupled to the inputs of comparator 222. As illustrated in FIG. 5, $V_{REF}$ 250 is coupled to the inverting input of comparator 222, and integral node 232 is coupled to the non-inverting input. Comparator 222 outputs a high voltage level, or logic one value, when integral node 232 has a higher voltage potential than $V_{REF}$ 250. Comparator 222 outputs a low voltage level, or logic zero value, when integral node 232 has a lower voltage potential than $V_{REF}$ 250. The output of comparator 222 is an active-low signal. When the voltage potential of integral node 232 falls below $V_{REF}$ 250, comparator 222 indicates an over-current condition by outputting a logic zero value to fault counter 224. In other embodiments, $V_{REF}$ 250 is coupled to the non-inverting input of comparator 222, and integral node 232 is coupled to the inverting input of comparator 222. The comparator 222 output is then active-high, outputting a logic one value when integral node 232 falls below $V_{REF}$ 250 to indicate an over-current condition.

Each time comparator 222 is asserted, fault counter 224 notes an over-current event. Fault counter 224 asserts the reset input of SR latch 202 through OR gate 206 after a threshold number of over-current events are observed in a predetermined amount of time, or after a threshold number of over-current events are observed in a row each power cycle.

Switch 238 is controlled by DRV signal 114 to couple $I_{OCP}$ 234 to integral node 232 when MOSFET 112 is turned on. Switch 240 has a different control scheme, being closed while electric current is flowing through secondary winding 108. Switch 240 is closed when MOSFET 112 is switched off to couple transconductance current 242 to integral node 232, since current begins flowing through secondary winding 108 to $V_{OUT}$ node 124 when MOSFET 112 is switched off. In CCM, switch 240 is opened when MOSFET 112 is switched on again, since the rising current through primary winding 106 reverse biases diode 130 and substantially stops current through secondary winding 108. In DCM, current through secondary winding 108 stops when the magnetic energy in transformer 105 is substantially discharged to secondary side 104 even though MOSFET 112 is not immediately switched back on. In DCM, controller 120 uses ZCD input 200 to determine when substantially zero electric current flows through secondary winding 108, and opens switch 240 when ZCD node 200 is asserted.

Switch 240 is controlled by a Q output of SR latch 252. The set input of SR latch 252 is asserted by pulse generator 254 at falling edges of DRV signal 114. Pulse generator 254 is a rising-edge pulse generator that briefly asserts an output when an input of the pulse generator transitions from a logic zero to a logic one. Falling edges of DRV signal 114 occur when MOSFET 112 is switched off, and inverter 255 converts the falling edges of DRV signal 114 to rising edges input to pulse generator 254. Pulse generator 254 outputs a pulse to the set input of SR latch 252, which closes switch 240, on falling edges of control signal 114. In other embodiments, a falling-edge pulse generator is used for pulse generator 254 without inverter 255.

The reset input of SR latch 252 is coupled to an output of pulse generator 260. Pulse generator 260 is similar to pulse generator 254, and outputs a logic one value briefly after a rising transition of the output of OR gate 262. OR gate 262 has two inputs, either of which resets SR latch 252 on a rising edge. In CCM mode, the rising edge of DRV signal 114 at a first input of OR gate 262 resets SR latch 252 when MOSFET 112 is switched on. Current through secondary winding 108 substantially stops when MOSFET 112 is switched on, so transconductance current 242 is disconnected from integral node 232 to stop integrating secondary current.

In DCM, current through secondary winding 108 substantially stops when transformer 105 is nearly fully discharged to secondary side 104. ZCD input 200 falls below the voltage potential of ground node 113 when the zero current threshold through secondary winding 108 is reached. ZCD input 200 is compared against ground voltage by comparator 264, which outputs a logic one value when secondary winding 108 and diode 130 substantially stop conducting electric current. In DCM, ZCD input 200 resets SR latch 252 when current through secondary winding 108 substantially stops, even though MOSFET 112 has not been turned on. In CCM, SR latch 252 is reset when MOSFET 112 is switched on. OR gate 262 allows either CCM or DCM to operate properly without requiring controller 120 to be reconfigured. Switch 266 disconnects ZCD node 200 from comparator 264 during the on-time of MOSFET 112 to reduce the likelihood of spurious ZCD detection.

Pulse generator 270 is coupled to the Q output of SR latch 252 through inverter 271. Pulse generator 270 is similar to pulse generators 254 and 260, and turns on switch 272 briefly each time SR latch 252 is reset, i.e., at falling edges of the Q output of SR latch 252. Pulse generator 270 pulses on rising edges of an input signal, and inverter 271 converts falling edges of the Q output of SR latch 252 to rising edges at the input of pulse generator 270. In other embodiments, pulse generator 270 is a falling edge pulse generator and used without inverter 271. Pulse generator 270 closing switch 272 connects $C_{INT}$ 230 to $V_{REF}$ 250 at the beginning of each power cycle. As switch 240 is opened and switch 238 is closed to begin integrating $I_{OCP}$ 234, the voltage potential at integral node 232 is reset to $V_{REF}$ 250 by pulse generator 270 briefly closing switch 272. $I_{OCP}$ 234 raises the voltage potential of integral node 232 a certain amount above $V_{REF}$ 250 while MOSFET 112 is turned on, which sets a threshold. Transconductance current 242 reduces the voltage while secondary winding 108 is conducting. If transconductance current 242 reduces the voltage potential of integral node 232 from the threshold set by $I_{OCP}$ 234 to below $V_{REF}$ 250, then an over-current condition is detected and comparator 222 asserts an output to fault counter 224. If the output current of SMPS 100 is within acceptable limits, transconductance current 242 will not be at a magnitude sufficient to fully discharge $C_{INT}$ 230 back to the voltage potential of $V_{REF}$ 250, and the output of comparator 222 will not be asserted. In either case, switch 272 is closed to start the next power cycle, so that integral node 232 will begin at the voltage potential of $V_{REF}$ 250.

Figure 6A:
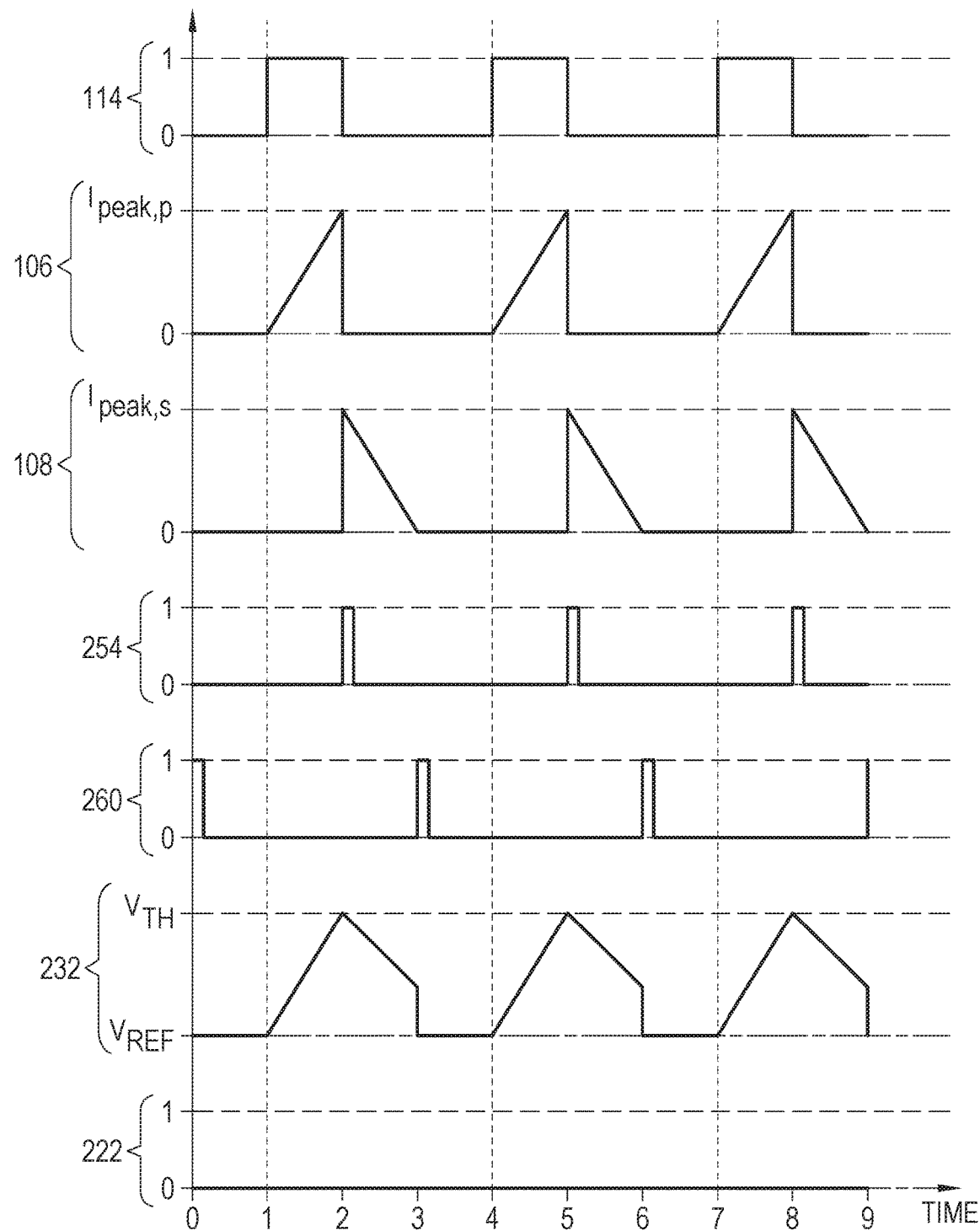
FIGS. 6a-6b illustrate the auto-tuning current limiter operating in discontinuous conduction mode.
Figure 6B:
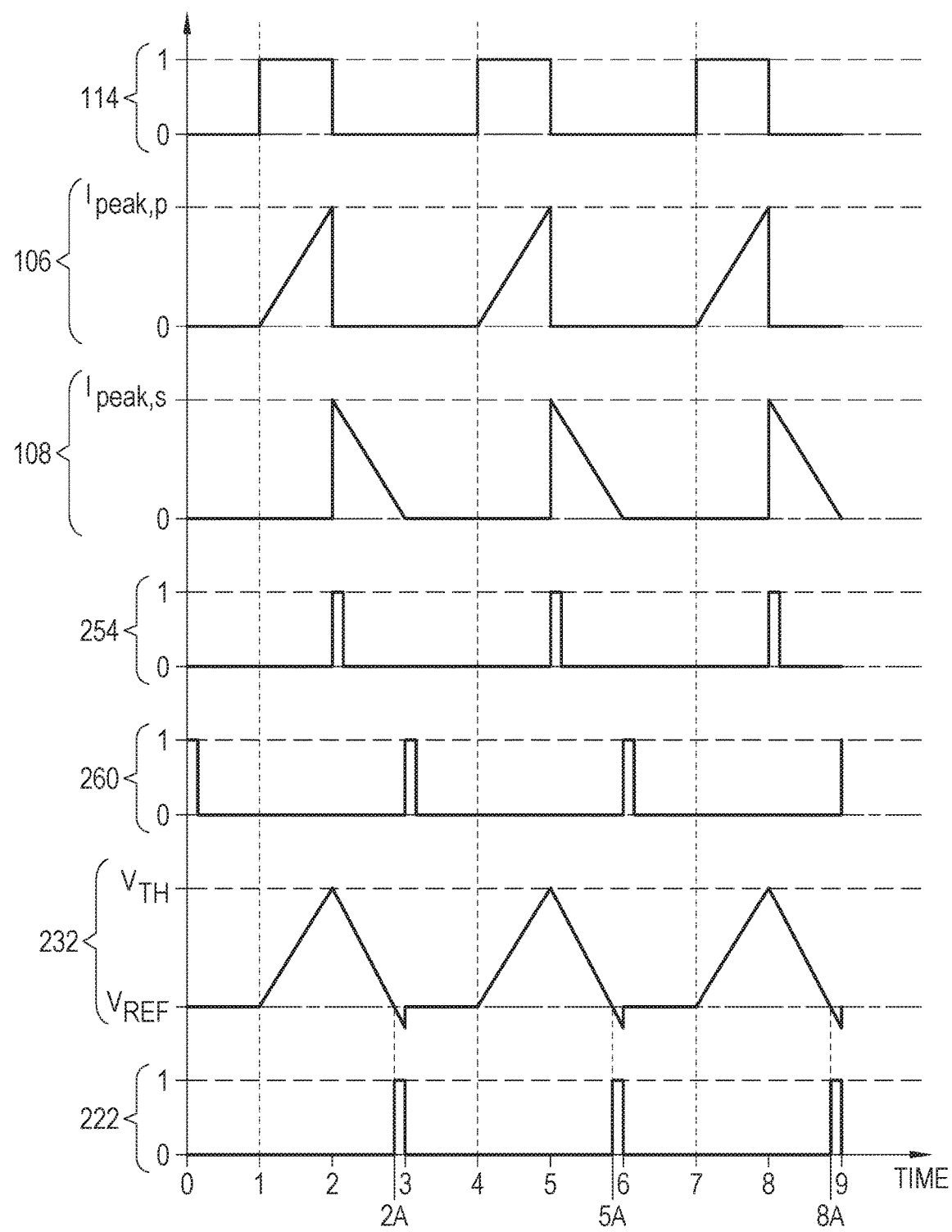

FIGS. 6a-6b illustrate controller 120 with integrator 220 operating in DCM. Time is illustrated on the horizontal, or X, axis, and voltage, current, or logical value is illustrated on the vertical, or Y, axis. FIG. 6a illustrates SMPS 100 operating within allowable current parameters, and FIG. 6b illustrates SMPS 100 exceeding the set current limit. At time 1, a new power cycle begins with a positive transition on DRV signal 114 switching MOSFET 112 on. MOSFET 112 turns on, which begins electric current flowing through primary winding 106 and closes switch 238. Current through primary winding 106 begins at approximately 0, and increases approximately linearly to $I_{PEAK,P}$ at time 2.

Meanwhile, the voltage potential of integral node 232 increases as $I_{OCP}$ 234 charges $C_{INT}$ 230. The voltage potential of integral node 232 increases from $V_{REF}$ at time 1 to a threshold voltage, $V_{TH}$, at time 2. The value of $V_{TH}$ is determined by the magnitude of $I_{OCP}$ 234. A larger $I_{OCP}$ 234 magnitude results in a larger $V_{TH}$, and a higher current limit for SMPS 100. At time 2, DRV signal 114 transitions low by comparator 210 determining CS node 119 has surpassed FB node 160, and MOSFET 112 is switched off. Current through primary winding 106 is substantially stopped because of increased resistance through MOSFET 112, and transformer 105 begins discharging by increased current through secondary winding 108. The negative transition of DRV node 114 at time 2 opens switch 238 to disconnect $I_{OCP}$ 234 from integral node 232, and triggers pulse generator 254 to set SR latch 252 and close switch 240.

Switch 240 connects transconductance current 242 to integral node 232 to begin discharging $C_{INT}$ 230 to ground node 113 at time 2. The magnitude of transconductance current 242, and thus the rate of discharge of $C_{INT}$ 230, is controlled by the average voltage potential of CS node 119. The voltage of CS node 119 is related to output current per equation 2, and the discharge rate of $C_{INT}$ 230 is therefore approximately proportional to output current of SMPS 100. Current through secondary winding 108 falls approximately linearly from time 2 to time 3 as the energy in transformer 105 is discharged. At the same time, the voltage potential at integral node 232 is reduced approximately linearly by transconductance current 242 discharging $C_{INT}$ 230. SMPS 100 is operating in DCM, and transformer 105 is approximately fully discharged to secondary side 104 at time 3 when the current through secondary winding 108 falls to approximately zero.

When the current through secondary winding 108 becomes approximately zero at time 3, ZCD signal 200 triggers pulse generator 260, through comparator 264 and OR gate 262, to reset SR latch 252. The Q output of SR latch 252 transitions from high to low, which opens switch 240 to cease discharging $C_{INT}$ 230 through transconductance current 242. The current output of SMPS 100 is relatively low in FIG. 6a, and the transconductance current 242 did not fully discharge $C_{INT}$ 230 back to $V_{REF}$ 250 during the conduction period of secondary winding 108. Comparator 222 never asserts the output to fault counter 224 because integral node 232 never falls below $V_{REF}$ 250.

On the other hand, in FIG. 6b, SMPS 100 is experiencing a significantly heavier load. Transconductance current 242 has a higher magnitude in FIG. 6b because the heavier load results in a higher average voltage potential of CS node 119. The voltage potential of integral node 232 falls at a higher rate of change between times 2 and 3 in FIG. 6b than in FIG. 6a due to the larger magnitude of transconductance current 242 discharging $C_{INT}$ 230. Where the lighter load in FIG. 6a resulted in the voltage potential of integral node 232 never falling below $V_{REF}$ 250, the heavier load in FIG. 6b causes integral node 232 to fall below $V_{REF}$ 250 at time 2a. Comparator 222 asserts the output to fault counter 224 at time 2a in FIG. 6b, and fault counter 224 counts the over-current condition. If comparator 222 asserting a fault signal to fault counter 224 at time 2a is the first over-current condition detected, fault counter 224 may begin a timer to determine whether a certain number of pulses are subsequently observed before the timer expires.

In both FIGS. 6a and 6b, current through secondary winding 108 substantially ceases at time 3, and ZCD resetting SR latch 252 triggers pulse generator 270. Pulse generator 270 briefly closes switch 272 and resets the voltage potential of integral node 232 to $V_{REF}$ 250. Both switches 238 and 240 are open while neither primary winding 106 nor secondary winding 108 are conducting. Integral node 232 remains at the voltage potential of $V_{REF}$ 250 from time 3 until time 4 when MOSFET 112 is turned on again and the cycle restarts. Current through primary winding 106 begins increasing from approximately zero at time 4, and integral node 232 begins increasing from approximately $V_{REF}$ 250.

The voltage potential of integral node 232 peaks at times 2, 5, and 8 at a voltage potential of $V_{TH}$, which is a function of the magnitude of $I_{OCP}$ 234. The peaks of integral node 232 reach substantially the same $V_{TH}$ voltage potential each power cycle. On the other hand, the amount by which the voltage potential of integral node 232 falls each power cycle is variable based on the output current magnitude of SMPS 100. If the output current of SMPS 100 exceeds a threshold set by $I_{OCP}$ 234, the average voltage potential of CS node 119 will be high enough to cause integral node 232 to fall below the voltage potential of $V_{REF}$ 250 before the time when secondary current substantially stops at times 3, 6, and 9. If the output current of SMPS 100 is below the desired threshold, the voltage potential of CS node 119 will be lower and insufficient to fully discharge $C_{INT}$ 230 back to $V_{REF}$ 250 within the conduction time of secondary winding 108.

Figure 7A:
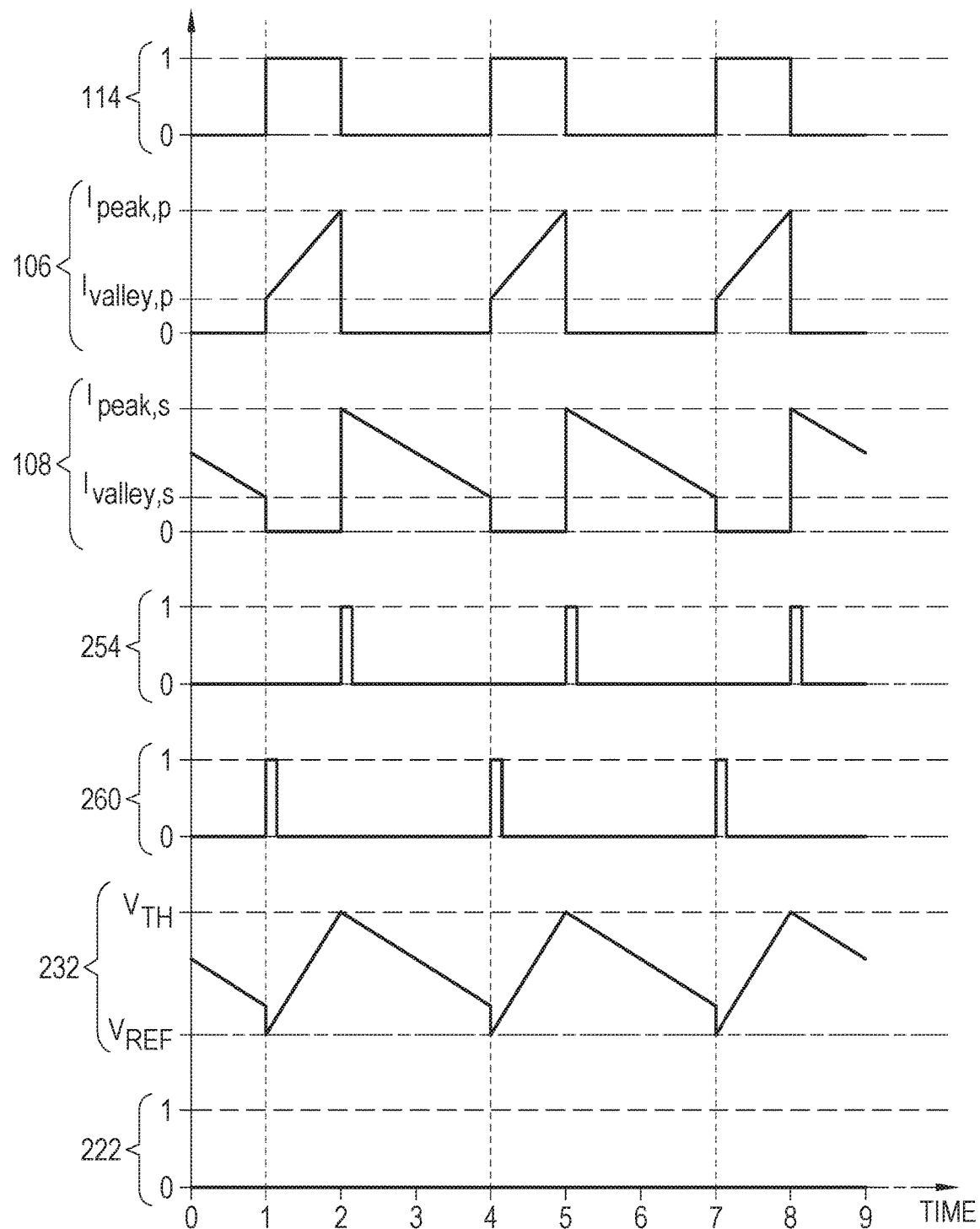
FIGS. 7a-7b illustrate the auto-tuning current limiter operating in continuous conduction mode.
Figure 7B:
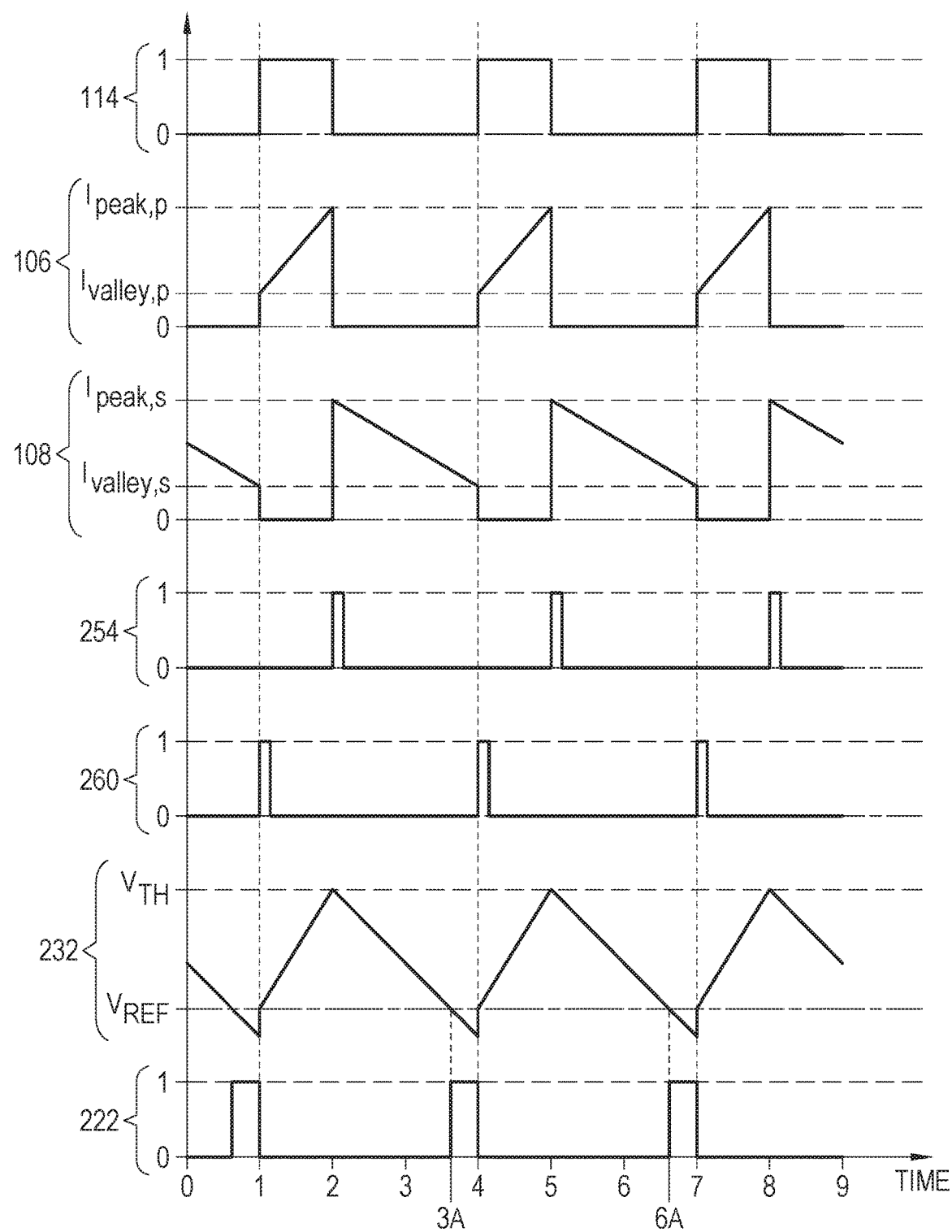

FIGS. 7a and 7b show operation of integrator 220 under CCM operation. MOSFET 112 is turned on by DRV signal 114 from time 1 to time 2. Current through primary winding 106 rising quickly from zero to $I_{VALLEY,P}$ at time 1 because of magnetic energy remaining in transformer 105. Current through primary winding 106 rises from $I_{VALLEY,P}$ at time 1 to $I_{PEAK,P}$ at time 2 while MOSFET 112 is on. Meanwhile, the rising edge of DRV signal 114 triggers pulse generator 260 to reset SR latch 252, briefly closing switch 272 to reset integral node 232 to $V_{REF}$ 250 and opening switch 240 to disconnect transconductance current 242 from integral node 232. DRV signal 114 being high closes switch 238 to couple $I_{OCP}$ 234 to integral node 232.

$I_{OCP}$ 234 charges $C_{INT}$ 230 from time 1 to time 2, and the voltage potential at integral node 232 rises from $V_{REF}$ at time 1 to $V_{TH}$ at time 2. The voltage $V_{TH}$ reached at time 2 sets a threshold for SMPS 100 output current. DRV signal 114 switches off MOSFET 112 at time 2, substantially stopping current through primary winding 106. Current through secondary winding 108 quickly rises to $I_{PEAK,S}$ at time 2 as the magnetic energy stored in transformer 105 is discharged to secondary side 104. Secondary current falls approximately linearly from $I_{PEAK,S}$ at time 2 to $I_{VALLEY,S}$ at time 4 as the energy in transformer 105 diminishes.

DRV signal 114 being off when secondary winding 108 is conducting opens switch 238 to disconnect $I_{OCP}$ 234, and the negative transition at time 2 connects transconductance current 242 to integral node 232. Therefore, while the energy in transformer 105 is diminishing, and the current through secondary winding 108 is falling, from time 2 to time 4, $C_{INT}$ 230 is being discharged to ground node 113 through transconductance current 242 at a rate proportional to the output current of SMPS 100. The cycle restarts at time 4 when DRV signal 114 going high substantially stops current through secondary winding 108, resets integral node 232 to $V_{REF}$ 250, opens switch 240 to disconnect transconductance current 242, and closes switch 238 to begin charging $C_{INT}$ 230 through $I_{OCP}$ 234.

As with DCM, the average voltage potential of CS node 119 in FIGS. 7a-7b, and thus the magnitude of transconductance current 242, is proportional to output current. Integral node 232 will fall to a certain voltage potential from time 2-4, depending on the magnitude of transconductance current 242. In FIG. 7a, output current is below a desired limit, and the corresponding average voltage potential of CS node 119 sets transconductance current 242 such that $C_{INT}$ 230 is not fully discharged back to the voltage potential of $V_{REF}$ 250. When the power cycle starts over by DRV signal 114 turning on MOSFET 112 at time 4, integral node 232 remains above $V_{REF}$ 250, and comparator 222 does not assert an error signal to fault counter 224.

On the other hand, a higher magnitude output current in FIG. 7b results in the average CS node 119 value being sufficient to discharge $C_{INT}$ 230 below $V_{REF}$ 250 beginning from time 3a. Integral node 232 falling below $V_{REF}$ 250 at time 3a results in comparator 222 asserting an error signal to fault counter 224. Fault counter 224 increments or decrements a counter, and start a timer in some embodiments. The cycle begins again at time 4, with DRV signal 114 closing switch 238 and pulse generator 260 resetting integral node 232 to $V_{REF}$ 250 and opening switch 240. Integral node 232 rises to $V_{TH}$, which is similar for each power cycle, at time 5 as at time 2.

$C_{INT}$ 230 is again discharged from time 5 to time 7 while secondary winding 108 is conducting. In FIG. 7a, the output current of SMPS 100 remains within acceptable limits, and integral node 232 again remains above $V_{REF}$ 250 when the power cycle ends at time 7. In FIG. 7b, the output current of SMPS 100 remains in an over-current condition and integral node 232 is discharged below $V_{REF}$ 250 to assert the error signal from comparator 222 to fault counter 224. If the SMPS 100 output current increases, and the average voltage potential of CS node 119 output by LPF 246 changes sufficiently, FIG. 7a could enter an over-current condition as shown in FIG. 7b. If the load in FIG. 7b is decreased to be within the desired threshold, integral node 232 will not fall below $V_{REF}$ 250 in subsequent power cycles. Fault counter 224 disables switching of MOSFET 112 by asserting the reset input of SR latch 202 permanently or temporarily if fault counter 224 detects a threshold number of over-current conditions within a specified time period, or if fault counter 224 detects an over-current condition for a threshold number of power cycles in a row.

Controller 120 with dual-slope integrator 220 provides a current limit for SMPS 100 from primary side 102 that is substantially constant over a range of output voltages. A reference current is integrated over the on-time of MOSFET 112 by charging $C_{INT}$ 230 to set a threshold, and then the average voltage potential of CS node 119 is integrated over the off-time of MOSFET 112 in CCM, or demagnetization time in DCM, by discharging $C_{INT}$ 230 to determine whether output current is over the threshold. The over-current status is evaluated by comparator 222 comparing a final voltage potential of integral node 232 against $V_{REF}$ 250. When $C_{INT}$ 230 is discharged below $V_{REF}$ 250, which is the integrator initial condition, the over-current condition is detected by comparator 222 and communicated to fault counter 224.

Controller 120 determines whether an over-current condition exists based on the inequality in equation 3, which is evaluated by comparator 222.

$$I_{OCP}234 \cdot T_{ON} > T_{OFF} \cdot V_{CS,AVG} \cdot G_M \quad \text{Equation (3):}$$

The left-hand side of equation 3 represents integration of $I_{OCP}$ 234 over the on-time of MOSFET 112. Because $I_{OCP}$ 234 is a relatively constant magnitude, the integration is simplified to be current multiplied by time. The right-hand side of equation 3 represents integration of the average voltage potential of CS node 119 ($V_{CS,AVG}$) over the off-time of MOSFET 112. In DCM, the demagnetization time, $T_{DEM}$, is substituted for $T_{OFF}$. $G_M$ is the gain of transconductance amplifier 244, which determines the magnitude of the electric current discharging capacitor $C_{INT}$ 230 based on $V_{CS,AVG}$. As long as the inequality of equation 3 evaluates to true, the actual output current of SMPS 100 is within the desired maximum output current magnitude. If the integration of $V_{CS,AVG}$ over the off-time of MOSFET 112, or the demag-time in DCM, becomes greater than the integration of $I_{OCP}$ 234 over the on-time of MOSFET 112, then the inequality becomes false and comparator 222 recognizes an over-current condition.

Equation 4, below, gives the magnitude of $I_{OCP}$ 234 used for a desired maximum output current. In Equation 4, $I_{OUT,MAX}$ is the desired maximum output current of SMPS 100, n is the turns ratio of transformer 105, $R_{118}$ is the resistance value of resistor 118, and $G_M$ is the gain of transconductance amplifier 244.

$$I_{OCP}234 = (I_{OUT,MAX} \cdot n)/(R_{118} \cdot G_M) \quad \text{Equation (4):}$$

Setting an electric current magnitude of $I_{OCP}$ 234 using equation 4 allows output current of SMPS 100 to be accurately limited to a relatively constant value across a range of output voltages.

Primary side controller 120 uses a dual-slope integrator 220 to evaluate output current from secondary side 104 to a load. The integration allows an output current limit that is substantially constant independent of output voltage in either DCM or CCM. Controller 120 with integrator 220 maintains a substantially constant output current limit even when output voltage is changed while SMPS 100 is operating. During the on-time of MOSFET 112, a reference value is integrated. During the off-time in CCM, or demag-time in DCM, the sensed secondary current is integrated. Secondary current is proportional to the primary current, sensed at CS node 119, which allows evaluating output current without secondary side sensing. LPF 246 generates a signal proportional to the average voltage potential of CS node 119. Transconductance amplifier 244 generates a current through transconductance current 242 to discharge capacitor $C_{INT}$ 230 at a rate proportional to the output current.

If the sensed current integration results in a larger value than the reference value integration, an over-current condition is detected. The comparison is performed by integrating the reference and current sense signals in opposite directions on a common circuit node, integral node 232, using an integrating capacitor $C_{INT}$ 230. If the current sense integration returns integral node 232 to a beginning voltage potential of the integral node, the integration result of the current sense signal is greater than the integration result of the reference signal. An over-current condition is thus detected by comparator 222, and a pulse is output to fault counter 224.

Figure 8:
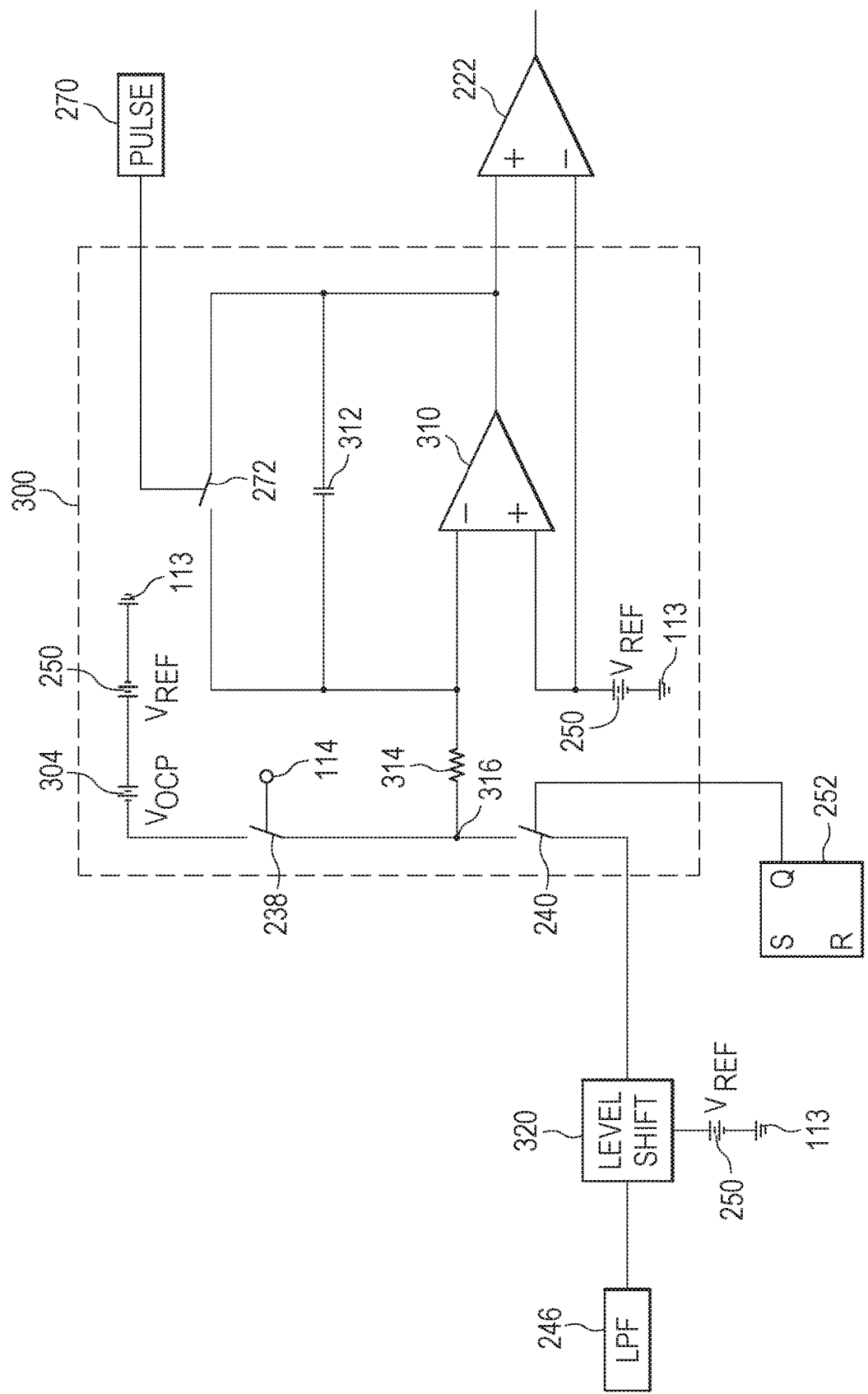
FIG. 8 illustrates a voltage mode integrator for the auto-tuning current limiter.

Integrator 220 in FIG. 5 operates in a current mode. The magnitudes of $I_{OCP}$ 234 and transconductance current 242 are current sources that charge and discharge a capacitor to perform integration. FIG. 8 illustrates an integrator 300, usable in place of integrator 220, which operates in a voltage mode. A reference voltage source, $V_{OCP}$ 304, is integrated over the on-time of MOSFET 112 by op-amp 310 to set a threshold. Op-amp 310 is configured as an integrator by the feedback network consisting of capacitor 312 and resistor 314. Resistor 314 is coupled between integrating input node 316 and the inverting input of op-amp 310.

The voltage potential at integrating input node 316 controls movement of the voltage potential output by op-amp 310. If the voltage potential at integrating input node 316 is greater than the voltage potential at the non-inverting input of op-amp 310, i.e., $V_{REF}$ 250, then the output of op-amp 310 decreases at a rate proportional to the difference between integrating input node 316 and $V_{REF}$ 250. If the voltage potential at integrating input node 316 is below $V_{REF}$ 250, the output voltage potential of op-amp 310 increases at a rate proportional to the difference between integrating input node 316 and $V_{REF}$ 250.

LPF 246 in FIG. 8 outputs a signal proportional to the average voltage potential of CS node 119, as in FIG. 5. SR latch 252 is set by pulse generator 254 and reset by pulse generator 260 as in FIG. 5. Falling edges of the Q output of SR latch 252 trigger pulse generator 270 as in FIG. 5. The output of comparator 222 is routed to fault counter 224 as in FIG. 5. Integrator 300 integrates Voce 304 over the on-time of MOSFET 112, and integrates the output voltage potential of LPF 246 over the off-time of MOSFET 112 or the demag-time of transformer 105. Integrator 300 evaluates the inequality of equation 5, which is evaluated to determine whether an over-current condition exists.

$$V_{OCP} \cdot T_{ON} > T_{OFF} \cdot V_{CS,AVG} \qquad \text{Equation (5):}$$

Equation 5 shows that if $V_{OCP}$ 304 integrated over the on-time of MOSFET 112 is greater than the voltage potential of CS node 119 integrated over the off-time of MOSFET 112, then operation is within the current limit. As with equation 3 for the current mode integrator 220, $T_{OFF}$ is replaced with $T_{DEM}$ in equation 5 when DCM is used.

As with the current mode integrator 220 in FIG. 5, switch 238 is controlled by control signal 114 to the gate terminal of MOSFET 112. Switch 238 is closed while MOSFET 112 is turned on to couple $V_{OCP}$ 304 to integrating input node 316. $V_{OCP}$ 304 is coupled to ground node 113 through $V_{REF}$ 250, which results in the voltage potential of integrating input node 316 being below the voltage potential of $V_{REF}$ 250 by the magnitude of Voce 304. Mirroring $V_{OCP}$ 304 across $V_{REF}$ 250 results in integrating input node 316 being below $V_{REF}$ 250 during the on-time of MOSFET 112, and the output voltage potential of op-amp 310 steadily rises at a rate proportional to $V_{OCP}$ 304.

When MOSFET 112 is switched off, switch 238 is opened and the output of op-amp 310 stops rising by connection to $V_{OCP}$ 304. The connection of $V_{OCP}$ 304 to integrating input node 316 for the on-time of MOSFET 112 has caused op-amp 310 to evaluate the left-hand side of equation 5. When MOSFET 112 is switched off, the voltage potential output by op-amp 310 is proportional to $V_{OCP}$ 304 integrated over the on-time of MOSFET 112.

When MOSFET 112 is turned off, switch 238 is opened, and switch 240 is closed to couple the output of LPF 246 to integrating input node 316. LPF 246 outputs a voltage potential approximately proportional to the average voltage potential of CS node 119. A level shift 320 is introduced to shift the output of LPF 246 by $V_{REF}$ 250. Level shift 320 is not used in all embodiments where a ground potential is used for $V_{REF}$ 250. While MOSFET 112 is off, and until ZCD signal 200 indicates current through secondary winding 108 has substantially ceased in DCM, switch 240 is closed to couple the output of LPF 246 to integrating input node 316. The voltage potential of integrating input node 316 includes a voltage potential that is above $V_{REF}$ 250 by an amount proportional to the output current of SMPS 100. The voltage potential output by op-amp 310 steadily falls at a rate approximately proportional to the output current of SMPS 100.

When switch 240 is closed, and the output of op-amp 310 is falling, integrator 300 is evaluating the right-hand side of equation 5, i.e., $V_{CS,AVG}$ over the off-time or demag-time. If the average voltage potential of CS node 119 over the off-time of MOSFET 112 is great enough to cause the output of op-amp 310 to fall below $V_{REF}$ 250, which was the starting value before $V_{OCP}$ set a threshold, then the output of comparator 222 to fault counter 224 is pulsed to indicate an over-current condition. At the beginning of each power cycle, as MOSFET 112 is turned on, pulse generator 270 briefly closes switch 272 to reset the output of op-amp 310 to $V_{REF}$ 250 through the virtual ground of op-amp 310.

Integrator 300 in FIG. 8 operates similarly to integrator 220 in FIG. 5, except that voltages are integrated rather than currents. The value of Voce is set as dictated in equation 6 below to enforce a desired output current limit.

$$V_{OCP} = I_{OUT,MAX}(R_{118}/n) \qquad \text{Equation (6):}$$

In Equation 6, $I_{OUT,MAX}$ is a desired maximum output current of SMPS 100, $R_{118}$ is the resistance value of resistor 118 used for current sensing, and n is the turns ratio of transformer 105. Setting $V_{OCP}$ 304 by equation 5 allows a current limit to be set for SMPS 100 that is substantially constant over a wide range of output voltage potentials.

Figure 9:
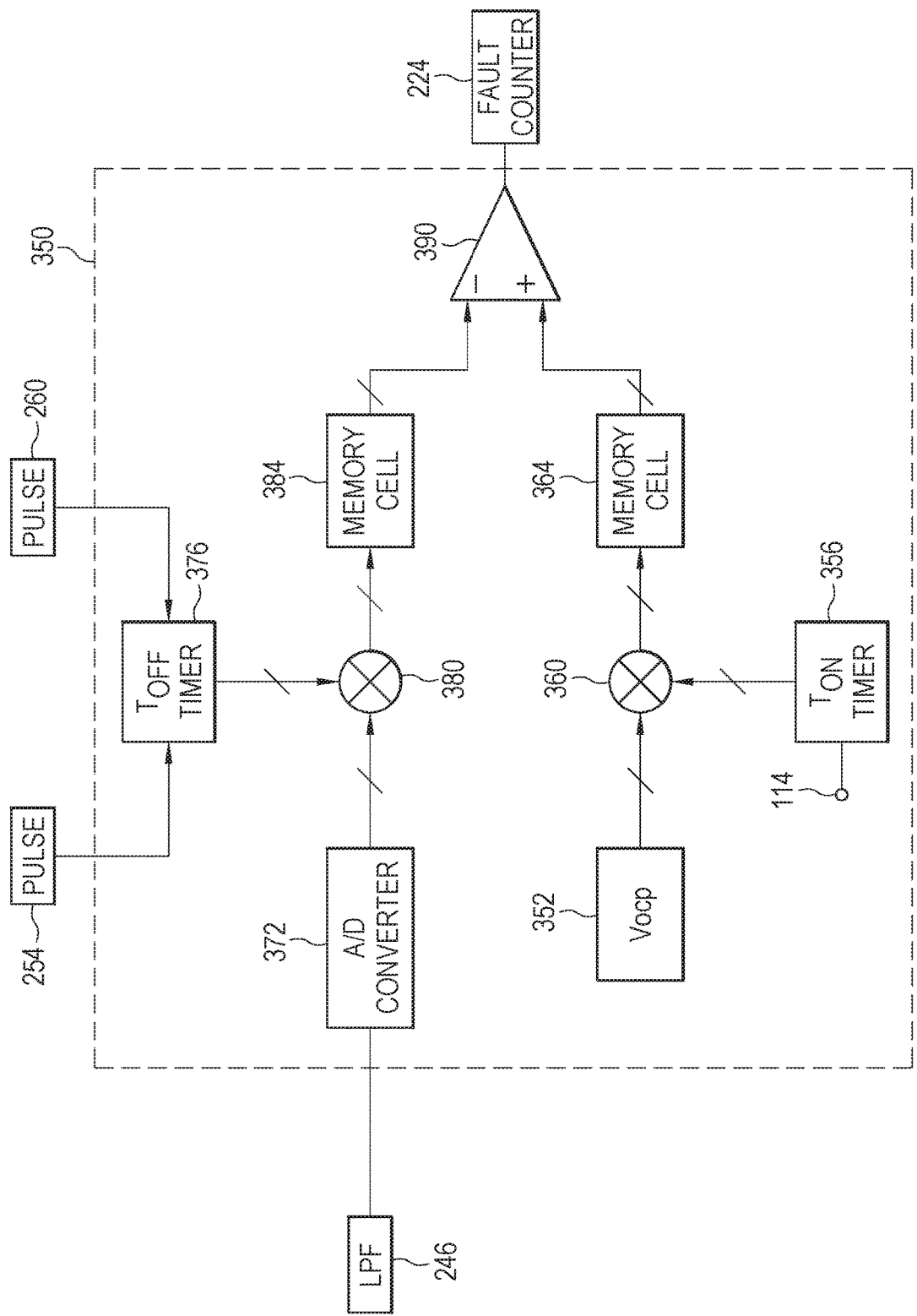
FIG. 9 illustrates a digital mode integrator for the auto-tuning current limiter.

In FIG. 9, a digital mode integrator 350 is illustrated. Integrator 350 uses digital circuitry to evaluate the integration over the on-time and off-time of MOSFET 112. A $V_{OCP}$ register 352 stores a digital value that sets the current limit. An on-time timer 356 measures the on-time of MOSFET 112 and outputs a digital value representative of the on-time to multiplier 360. Multiplier 360 evaluates the left-hand side of equation 4 by reading the value of $V_{OCP}$ register 352 and multiplying by the $T_{ON}$ value read from $T_{ON}$ timer 356. Multiplier 360 outputs a digital value representative of $V_{OCP}$ 352 integrated over the on-time of MOSFET 112 to memory cell or register 364. The output of LPF 246 is connected to an input of analog to digital (A/D) converter 372, rather than to transconductance amplifier 244 as in FIG. 5, although the input of LPF 246 is similarly coupled to CS node 119 so that LPF 246 generates an analog signal proportional to the average value of CS node 119. A/D converter 372 outputs a digital value representative of the output of LPF 246.

The digital value output by A/D converter 372 represents the average voltage potential at CS node 119, and is proportional to the output current of SMPS 100. An off-time timer 376 outputs a digital value representative of the amount of time that secondary winding 108 is conducting electric current, either $T_{OFF}$ or $T_{DEM}$. $T_{OFF}$ timer 376 is started by pulse generator 254 when MOSFET 112 is switched off. $T_{OFF}$ timer 376 is stopped by pulse generator 260 when either MOSFET 112 is switched on or ZCD signal 200 indicates the conduction period of secondary winding 108 has finished. Pulse generators 254 and 260 are controlled similarly in FIG. 9 as in FIG. 5, i.e., by DRV node 114 and ZCD node 200. In other embodiments, SR latch 252 is used and the Q output of the SR latch is coupled to start and stop $T_{OFF}$ timer 376. Multiplier 380 outputs a digital value to memory cell 384 that is equivalent to the output of LPF 246, represented by the digital value output by A/D converter 372, multiplied by the off-time or demag-time, represented by the digital value output by $T_{OFF}$ timer 376.

Comparator 390 is a digital comparator that compares memory cell 384, which contains the result of integrating CS node 119 over $T_{OFF}$ or $T_{DEM}$, against memory cell 364, which contains the result of integrating $V_{OCP}$ 352 over $T_{ON}$. Comparator 390 is combinational logic capable of comparing two digital values in one embodiment. In other embodiments, comparator 390 represents instructions executing an arithmetic logic unit to compare two register values. Comparator 390 asserts a digital control signal to fault counter 224 if the comparison between memory cell 384 and memory cell 364 indicates an over-current condition. The output of comparator 390 may be an active-low or active-high signal, similar to comparator 222.

Fault counter 224 operates similarly in each illustrated embodiment, because comparator 222 in FIGS. 5 and 8 output digital pulses on detection of an over-current condition as with comparator 390 in FIG. 9. Fault counter 224 measures the number of pulses output by comparator 390 over time, and halts switching of MOSFET 112 by asserting a signal to the reset input of SR latch 202 if a threshold number of over-current pulses are received in a predetermined amount of time. In other embodiments, fault counter 224 halts switching of MOSFET 112 based on a threshold number of power cycles in a row tripping the over-current calculation by comparator 390.

Figure 10:
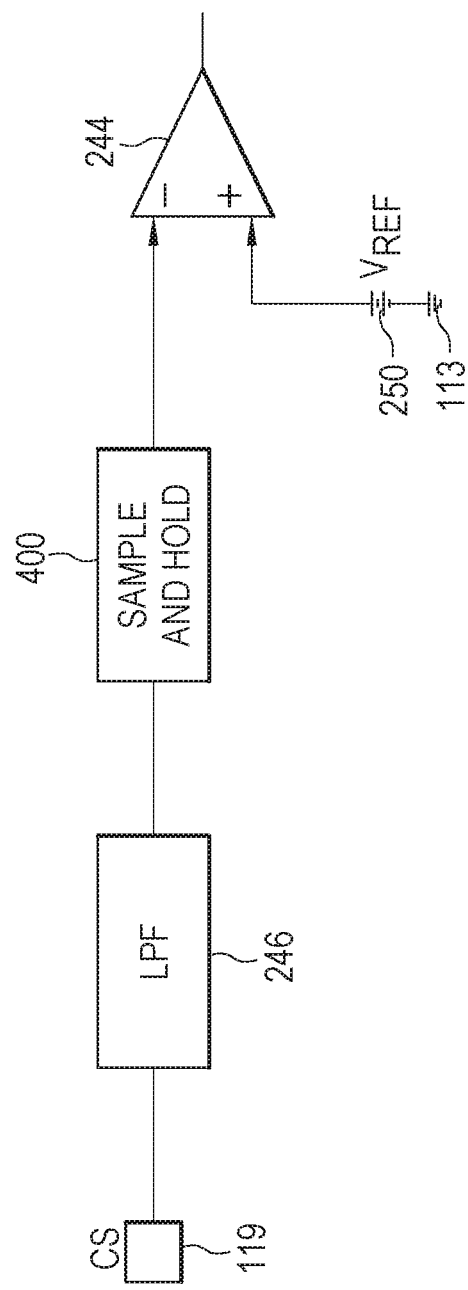
FIG. 10 illustrates a sample and hold circuit used with the auto-tuning current limiter.

FIG. 10 illustrates a sample and hold circuit 400 used at the output of LPF 246. Sample and hold circuit 400 is used in any of the above illustrated embodiments to sample the output of LPF 246 and hold the value for a power cycle. In the digital mode illustrated in FIG. 9, sample and hold circuit 400 may be integrated into the functionality of A/D converter 372. Sample and hold circuit 400 allows LPF 246 to be designed with a shorter time constant to reduce the physical size of LPF 246 on the silicon of controller 120. The information about the average voltage potential of CS node 119 is stored in sample and hold circuit 400 and updated each power cycle.

While one or more embodiments have been illustrated and described in detail, the skilled artisan will appreciate that modifications and adaptations to those embodiments may be made without departing from the scope of the present disclosure.

What is claimed:

1. A controller in a power conversion circuit, comprising:
an integration node coupled to an input of the controller;
a first amplifier including a first input coupled to the integration node, a second input coupled to a first reference source, and an output coupled to an output of the controller;
a capacitor coupled between the output of the first amplifier and the first input of the first amplifier;
a first switching circuit coupled between the input of the controller and the integration node;
a second switching circuit coupled between the integration node and a second reference source;
a counter including a first input coupled to the output of the first amplifier; and
a latching circuit including a first input coupled to an output of the counter, wherein the counter is configured to:
monitor a number of over-current conditions over time;
determine the number of over-current conditions exceeds a threshold amount; and in response,
assert a reset signal of the latching circuit.

2. The controller of claim 1, further including:
a third switching circuit coupled between the output of the first amplifier and the first input of the first amplifier; and
a pulse generating circuit including an output coupled to a control input of the third switching circuit.

3. The controller of claim 1, further including a second amplifier including a first input coupled to the output of the first amplifier, a second input coupled to the first reference source, and an output coupled to the output of the controller.

4. The controller of claim 1, further including a second latching circuit including an output coupled to a control input of the first switching circuit.

5. The controller of claim 1, wherein a control input of the second switching circuit is coupled to the output of the controller.

6. The controller of claim 1, further including:
a filter including an input coupled to the input of the controller; and
a level shift circuit including an input coupled to an output of the filter and an output coupled to the integration node.

7. A controller in a power conversion circuit, comprising:
an integration node;
a first amplifier including a first input coupled to the integration node, a second input coupled to a first reference source, and an output coupled to an output of the controller;
a capacitor coupled between the output of the first amplifier and the first input of the first amplifier;
a first switching circuit coupled between the output of the first amplifier and the first input of the first amplifiers;
a counter including a first input coupled to the output of the first amplifier; and
a latching circuit including a first input coupled to an output of the counter, wherein the counter is configured to:
monitor a number of over-current conditions over time;
determine the number of over-current conditions exceeds a threshold amount; and in response,
assert a reset signal of the latching circuit.

8. The controller of claim 7, further including a pulse generating circuit including an output coupled to a control input of the first switching circuit.

9. The controller of claim 7, further including a second amplifier including a first input coupled to the output of the first amplifier, a second input coupled to the first reference source, and an output coupled to the output of the controller.

10. The controller of claim 7, further including:
   a second switching circuit coupled between an input of the controller and the integration node; and
   a third switching circuit coupled between the integration node and a second reference source.

11. The controller of claim 10, further including a second latching circuit including an output coupled to a control input of the second switching circuit.

12. The controller of claim 10, wherein a control input of the third switching circuit is coupled to the output of the controller.

13. The controller of claim 7, further including:
   a filter including an input coupled to an input of the controller; and
   a level shift circuit including an input coupled to an output of the filter and an output coupled to the integration node.

14. A controller in a power conversion circuit, comprising:
   an integration node;
   an integration circuit coupled to the integration node;
   a first switching circuit coupled between an input of the controller and the integration node; and
   a second switching circuit coupled between the integration node and a first reference source;
   a counter including a first input coupled to an output of the integration circuit; and
   a latching circuit including a first input coupled to an output of the counter, wherein the counter is configured to:
      monitor a number of over-current conditions over time;
      determine the number of over-current conditions exceeds a threshold amount; and in response,
      assert a reset signal of the latching circuit.

15. The controller of claim 14, wherein the integration circuit includes:
   a first amplifier including a first input coupled to the integration node, a second input coupled to a second reference source, and an output coupled to an output of the controller;
   a capacitor coupled between the output of the first amplifier and the first input of the first amplifier; and
   a third switching circuit coupled between the output of the first amplifier and the first input of the first amplifier.

16. The controller of claim 15, further including a pulse generating circuit including an output coupled to a control input of the third switching circuit.

17. The controller of claim 15, further including a second amplifier including a first input coupled to the output of the first amplifier, a second input coupled to the second reference source, and an output coupled to the output of the controller.

18. The controller of claim 14, further including a second latching circuit including an output coupled to a control input of the first switching circuit.

19. The controller of claim 14, wherein a control input of the second switching circuit is coupled to the output of the controller.

20. The controller of claim 14, further including:
   a filter including an input coupled to an input of the controller; and
   a level shift circuit including an input coupled to an output of the filter and an output coupled to the integration node.

* * * * *